(12) United States Patent
Augustine et al.

(10) Patent No.: US 11,073,979 B2
(45) Date of Patent: Jul. 27, 2021

(54) NON-LINEAR NAVIGATION OF DATA REPRESENTATION

(71) Applicant: ARRIS Enterprises LLC, Suwanee, GA (US)

(72) Inventors: Bruce A. Augustine, Lakeinthehill, IL (US); Allyson J. Beuhler, Woodridge, IL (US); Kevin M. Brooks, Malden, MA (US); Jeffrey E. Tycz, Palo Alto, CA (US); Xia Yue, Mountain View, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 1377 days.

(21) Appl. No.: 13/842,620

(22) Filed: Mar. 15, 2013

(65) Prior Publication Data

US 2014/0282739 A1 Sep. 18, 2014

(51) Int. Cl.
*H04N 21/482* (2011.01)
*G06F 3/0485* (2013.01)
(Continued)

(52) U.S. Cl.
CPC ........ *G06F 3/04855* (2013.01); *G06F 3/0485* (2013.01); *G06F 3/04847* (2013.01);
(Continued)

(58) Field of Classification Search
CPC ............... G06F 3/0485; G06F 3/04855; G06F 2203/04806; G06F 2203/04805;
(Continued)

(56) References Cited

U.S. PATENT DOCUMENTS 7,434,177 B1 * 10/2008 Ording ................ G06F 3/04842
715/862
7,685,619 B1 * 3/2010 Herz .................. H04N 21/4147
725/52
(Continued)

FOREIGN PATENT DOCUMENTS

KR 10-2004-0030971 A 4/2004

OTHER PUBLICATIONS

Tivo, Inc., "Now Available: The TiVo Premiere App for iPad, the must-have app for iPad", Official TiVo Blog, URL: <http://blog.tivo.com/2011/01/now-available-the-tivo%C2%AE-premiere-app-for-ipad-the-must-have-app-for-ipad/>, Jan. 18, 2011.
(Continued)

*Primary Examiner* — Arpan P. Savla
*Assistant Examiner* — Pritisha N Parbadia
(74) *Attorney, Agent, or Firm* — Wenderoth, Lind & Ponack, L.L.P.

(57) ABSTRACT

A method for scrolling through a representation of data that is too large to be presented legibly in its entirety within confines of a display is disclosed. The method includes presenting a section of the representation on the display. A portion of the representation is selected, using the section presented on the display, for scrolling on. The presentation of the section presented on the display is modified to include additional representation based on the portion selected. The additional content is to be presented in a non-linear fashion. Input from a user interface associated with movement through the additional content is received. The movement is to provide non-linear scrolling through the additional content. Apparatus for performing the method is also disclosed.

32 Claims, 23 Drawing Sheets

(51) Int. Cl.
*H04N 21/422* (2011.01)
*G06F 3/0488* (2013.01)
*G09G 5/34* (2006.01)
*H04N 21/431* (2011.01)
*G06F 3/0484* (2013.01)
*H04N 21/47* (2011.01)

(52) U.S. Cl.
CPC ...... *G06F 3/04883* (2013.01); *G06F 3/04886* (2013.01); *G09G 5/34* (2013.01); *H04N 21/422* (2013.01); *H04N 21/4312* (2013.01); *H04N 21/47* (2013.01); *H04N 21/4821* (2013.01); *G06F 2203/04805* (2013.01); *G06F 2203/04806* (2013.01); *G09G 2340/045* (2013.01); *G09G 2340/145* (2013.01); *H04N 21/482* (2013.01)

(58) Field of Classification Search
CPC ............. G06F 3/04886; G06F 3/04883; G06F 3/04847; H04N 21/482; H04N 21/47; H04N 21/422; H04N 21/4821; H04N 21/4312; G09G 2340/145; G09G 2340/045; G09G 5/34
USPC ...................................................... 715/784
See application file for complete search history.

(56) References Cited

U.S. PATENT DOCUMENTS

| | | | |
|---|---|---|---|
| 7,839,385 B2 | 11/2010 | Hunleth et al. | |
| 9,922,018 B2* | 3/2018 | Chan | G06F 40/18 |
| 10,209,863 B2* | 2/2019 | Zhang | G06F 3/04842 |
| 2003/0034990 A1* | 2/2003 | Roelofs | 345/660 |
| 2004/0100479 A1 | 5/2004 | Nakano et al. | |
| 2005/0091596 A1 | 4/2005 | Anthony et al. | |
| 2006/0123360 A1 | 6/2006 | Anwar et al. | |
| 2009/0100373 A1* | 4/2009 | Pixley | G06F 3/04855 715/786 |
| 2009/0187842 A1* | 7/2009 | Collins | G06F 3/0482 715/769 |
| 2009/0322676 A1* | 12/2009 | Kerr et al. | 345/158 |
| 2010/0231537 A1* | 9/2010 | Pisula | G11B 27/105 345/173 |
| 2011/0122078 A1 | 5/2011 | Kasahara | |
| 2012/0278840 A1* | 11/2012 | Glennon et al. | 725/56 |
| 2014/0059487 A1* | 2/2014 | Baumann | G06F 3/0482 715/811 |

OTHER PUBLICATIONS

Tivo, Inc., "An Update for TiVo Premiere", Official TiVo Blog, URL: <http://blog.tivo.com/2012/01/an-update-for-tivo-premiere/>, Jan. 18, 2012.

P. Miller, "New Xbox 360 due for late '07 to handle IPTV?", Engadget, URL: <http://www.engadget.com/2007/01/13/new-xbox-360-due-for-late-07-to-handle-iptv/>, Jan. 13, 2007.

B. Drawbaugh, "Macrovision re-invents itself as Rovi, kicks off with new guide "Liquid"", Engadget, URL: <http://www.engadget.com/2009/07/16/macrovision-re-invents-itself-as-rovi-kicks-off-with-new-guide/>, Jul. 16, 2009.

PCT Search Report & Written Opinion, Re: Application #PCT/US2014/019727; dated May 27, 2014.

Official Action, Re: Korean Application No. 10-2015-7025688, dated Jul. 1, 2016.

Officiall Action, Re: Canadian Application No. 2,903,779, dated Nov. 4, 2016.

Official Action, Re: Mexican Application No. MX/a/20151012400, dated Mar. 22, 2017.

European Examination Report, Re: Application No. 14711382.3, dated Oct. 18, 2018.

Official Action, Re: Canadian Application No. 2,903,779, dated Sep. 11, 2018.

Official Action, Re: Canadian Application No. 2,903,779, dated Oct. 19, 2017.

Examination Report, Re: European Application No. 14711382.3, dated Dec. 5, 2017.

European Examination Report, Re: Application No. 14711382.3, dated Dec. 5, 2017.

* cited by examiner

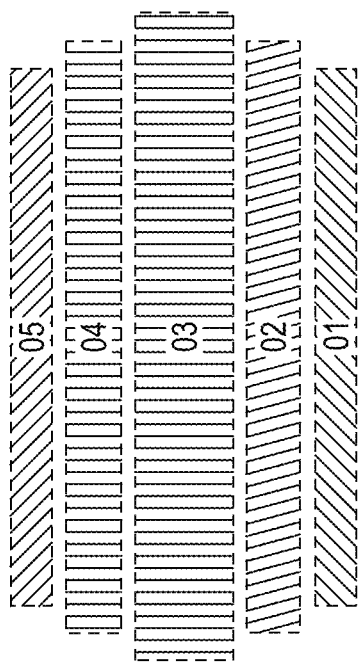
FIG. 14B
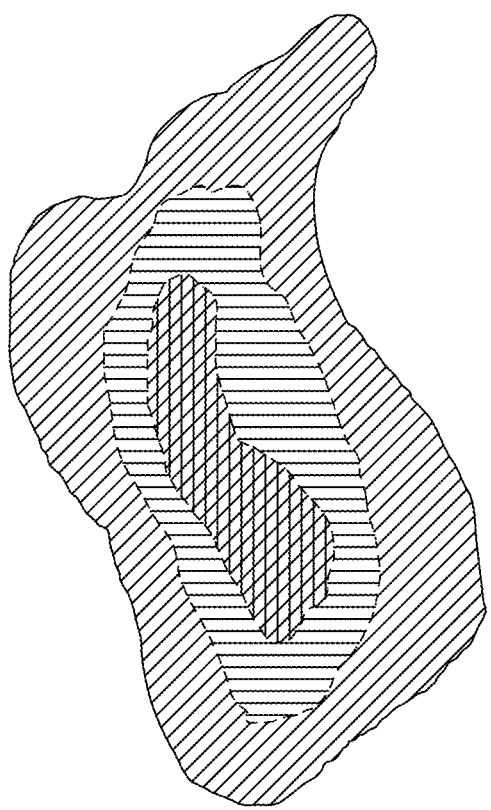
FIG. 14D
FIG. 14A
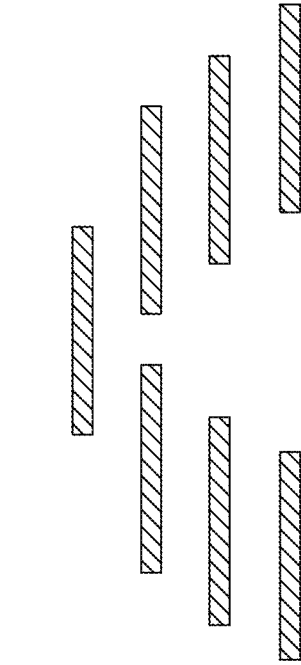
FIG. 14C

NON-LINEAR NAVIGATION OF DATA REPRESENTATION

BACKGROUND

Displays are utilized to present a representation of data to a user. The representation available for display may be larger than the display can present it in a format that is viewable by the user. Accordingly, the display may limit presentation of the representation to a section. The display may provide a user interface to, for example, allow the user to scroll in different directions so that the representation viewable on the screen is adjustable. If the representation is much larger than the display it may take a fair amount of scrolling to present a desired representation on the display.

The representation presented on a display may include a menu or listing of various items of information for purposes of permitting the user to utilize a user interface to interactively view the listings and/or select one of the displayed items or options from the listing. Such user interface displays are useful in many applications. One example of such a display is an electronic program guide ("EPG"), that typically provides a selection guide for channels and/or video or other media content, which can provide various information concerning channels and content available, at a selected time or over a period of time, to a subscriber of a cable TV operator, satellite TV operator, Internet broadcaster/service provider or other program provider.

An EPG is typically displayed on a display monitor or screen of a television, and can be displayed on a tablet, a laptop or other computer, a smart phone, a mobile device, a remote control unit, a media center device, or other electronic device associated with a monitor or screen. The EPG typically displays a listing of channels carried by the service provider, and information concerning the content of each channel with respect to a particular day and time of day. Channels are typically listed using one or more identifiers (e.g., a channel number, an abbreviated or full name of a network or content provider, logo of a network or content provider, a set of call letters, and the like). Typically, the list of channels is ordered or sorted by one of the identifiers, such as by channel number. A user may scroll through the channels available for viewing by, for example, using "channel up" or "channel down" commands on a user interface (e.g., remote control). Similarly, a user can enter a channel number on a user interface for navigating directly to a selected channel.

Conventional EPG user interface displays are provided in a tabular format with each item of information being provided on a separate line or row of the listing. Typically, where the information or selections are numerous the tabular listing provides only a subset of the overall selections at a time. The tabular listing may be provided in a scrollable format such that the user scrolls up or down (vertically) through rows or lines of the tabular listing to display items in the listing not currently displayed. Channel guide displays, as one example, also typically permit scrolling horizontally along lines or rows of the tabular listing for purposes of displaying additional information and content relative to days and/or times. As a variation on the tabular format discussed above, each row of a listing within a user interface display may provide information with respect to multiple different items in a grid-like pattern. It is also known to map or cause a listing of information to wrap onto a surface or skin of a displayed object shown in perspective view such that the listing follows the surface contour of the object shown in perspective.

A relatively large number of items to be represented may present practical difficulties in navigation or display. For instance, the number of channels or content provided by a cable TV, satellite TV, Internet service provider, or other service provider may be too numerous to be displayed in a sufficient size to be readily perceptible to an end user in a manner enabling channels and content to be readily, quickly and conveniently located within the interactive display. In fact, the amount of content to select from may be so great that it requires the end user to scroll through large amounts of content to find the content they are interested in. The scrolling may be linear meaning that the amount of movement of the user interface equates linearly to amount of content that scrolls within the display. As such, to scroll through a relatively large amount may take a relatively large amount of time. Accelerated scrolling may be utilized to enable a user to scroll through large amounts of data in a relatively short amount of time but are done without any real visibility into where the user is with regard to scrolling or accuracy.

BRIEF DESCRIPTION OF THE DRAWINGS

Various features of the embodiments described in the following detailed description can be more fully appreciated when considered with reference to the accompanying figures, wherein the same numbers refer to the same elements.

FIGS. 14A-D illustrates several example views of a 3D representation of data according to an embodiment.

DETAILED DESCRIPTION

Figures 1A, 1B:
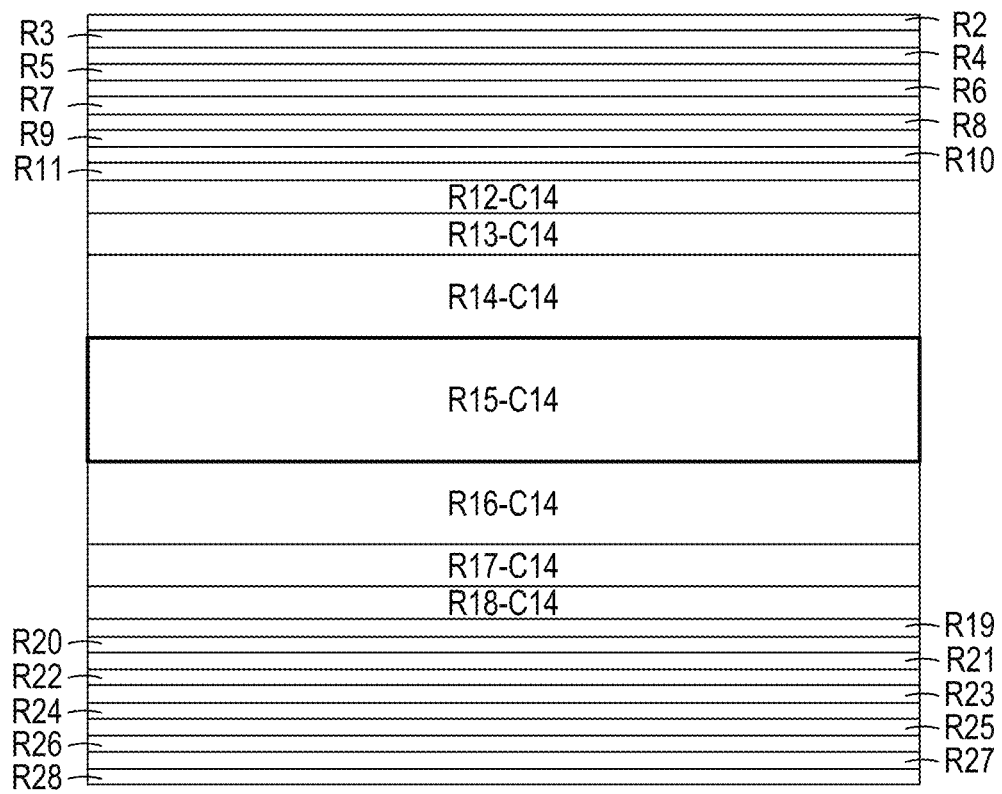
FIGS. 1A-H illustrate a section of a representation of data presented on a display and several modifications of the section to enable non-linear scrolling, according to various embodiments.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Programs that provide a representation of data that is too large for a user to readily see on the display may enable the user to scroll through the representation. Typical scrolling is linear meaning that the amount of movement of the user interface equates linearly to amount of content that scrolls within the display. A ratio of user interface movement to scrolling distance may adjust (increase or decrease) the rate of scrolling. If the rate of scrolling is to slow it may take an excessive amount of time to scroll to the data desired to be visible. Alternatively, if the rate is too fast the accuracy for finding the desired content may be low. Furthermore, the use of linear scrolling provides the same level of control in scrolling for desired content that is close in proximity to the currently viewed content as well as content that is far away.

For example, in a conventional EPG a user typically is presented with many more channels than the user can readily see on the display. Some conventional EPGs may present hundreds of channels or well over a thousand channels. Accordingly, the user may wish to scroll quickly through several hundred channels to be able to rapidly access the channel that the user wants. Some conventional systems provide fast or accelerated scrolling in a simplified manner, such that the user cannot readily see where they are in the channel map (or where they want to go), so the user does not necessarily know when to stop scrolling, and may be required to make an estimate without adequate feedback.

In an illustrative embodiment, the ability to scroll through a representation of data (that is too large for a user to readily see on a display) in a non-linear fashion is provided. A user interface may utilize non-linear effects in the display of at least a portion of the representation during non-linear scrolling. The representation may be segregated in some fashion (e.g., columns, rows) and the non-linear affects may include segregated portions (e.g., rows, columns) of the information varying in size based on their distance from a selected portion (e.g., row, column). For example, the size of columns may get smaller as the columns get farther away from a selected column.

Accordingly, the amount of segregated portions scrolled through with respect to movement of a user interface may vary based on the distance the user interface movement is from the selected portion as the size of the portions may vary based on their distance from the selected portion. For example, as the user moves the user interface farther from a selected column the same amount of movement will result in more columns being scrolled through as the movement will be covering more columns as the columns get smaller. The non-linear scrolling may provide fine-grain control of scrolling near the selected portion (the initial scrolling may act similar to linear scrolling) while also providing a method of rapid scrolling for a representation far from the selected portion. Furthermore, a user's motions may directly map to distance scrolled (which defines, for example, the columns scrolled through) so that the user may feel more in control of the accelerated scrolling provided hereby (for example, as opposed to accelerated scrolling provided by accelerated swipes).

In some embodiments, the non-linear scrolling effects may include an enhancing (e.g., zooming, enlarging, magnifying) effect during a scrolling operation. Any of numerous kinds of zoom or magnification effects, such as a simulated magnifying glass effect, may be used. The enhancing effects may be to enlarge a segment (and possibly add additional information to the segment) that is currently selected based on the movement of the user interface during scrolling so that the content contained therein may be visible. The enhancing effects may increase the accuracy of the non-linear scrolling as a user would be able to see exactly where they were in the content while scrolling.

FIGS. 1A-H illustrate a section of a representation of data presented on a display and several modifications of the section to enable non-linear scrolling, according to various embodiments. FIG. 1A illustrates a section of the representation presented on the display including a plurality of rows (3 illustrated) and columns (2 illustrated) creating a plurality of cells (6 illustrated) labeled R14-C14 through R16-C15. FIG. 1B illustrates an example modification of the section assuming that column 14 was selected for scrolling (portion of the section selected) and that cell R15-C14 was selected as a starting point (point of inflection within the selected portion) for scrolling, according to one embodiment. As illustrated, each cell (row) in the selected column extends across the entire display such that column 15 is not visible. The cells within the selected column are presented in a non-linear fashion (sizes vary). As illustrated, the selected cell (R15-C14) is centrally located and the cells that extend therefrom in each direction decrease in size as they get farther from the selected cell. The representation within each cell may be deemphasized (e.g., get smaller, fade to black) as the cells get farther from the selected cell.

Figure 1C:
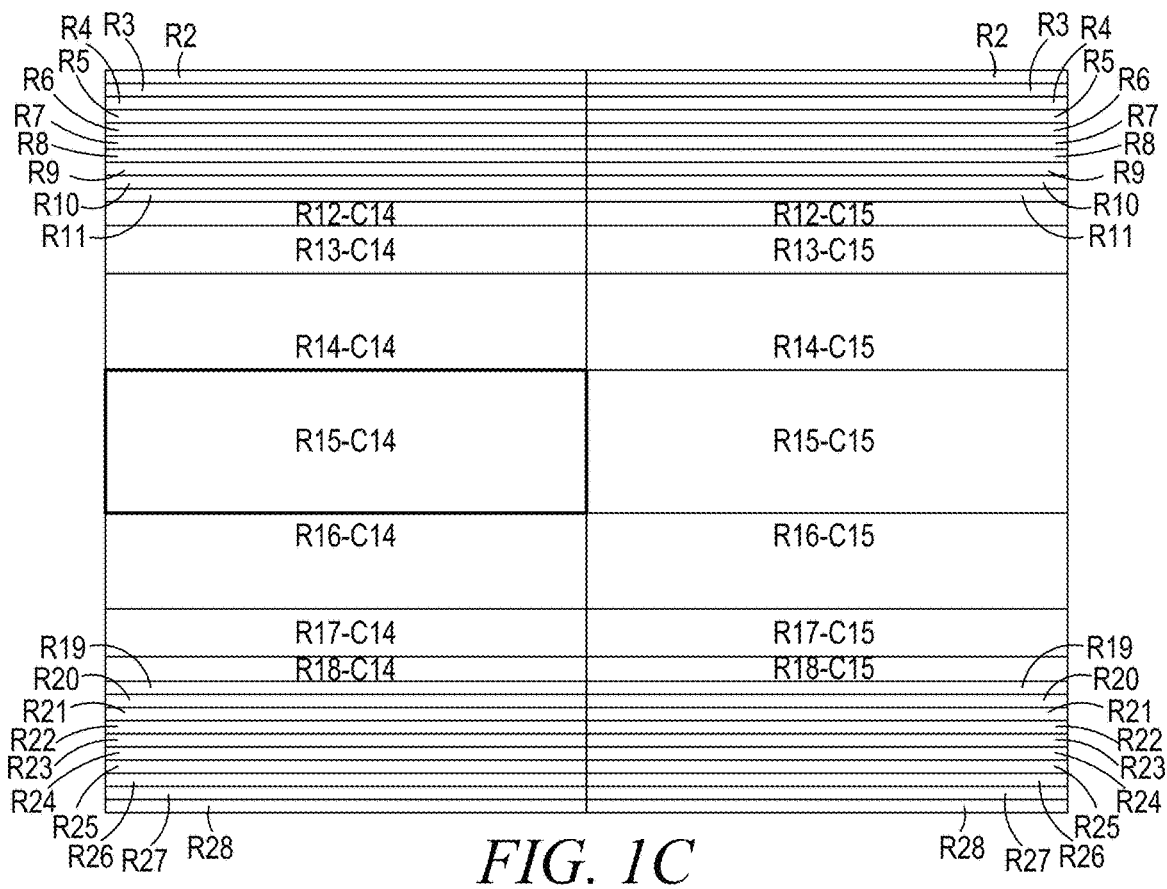

FIG. 1C illustrates an example modification of the section assuming that column 14 was selected for scrolling and that cell R15-C14 was selected as a starting point for scrolling, according to one embodiment. The rows for each column are presented in a non-linear fashion (sizes vary). As illustrated, the row associated with the selected cell (R15-C14) is centrally located and the rows that extend therefrom in each direction decrease in size as they get farther from the row associated with the selected cell. The representation within the cells in each row may be deemphasized (e.g., get smaller, fade to black) as they get farther from the row associated with the selected cell.

Figure 1D:
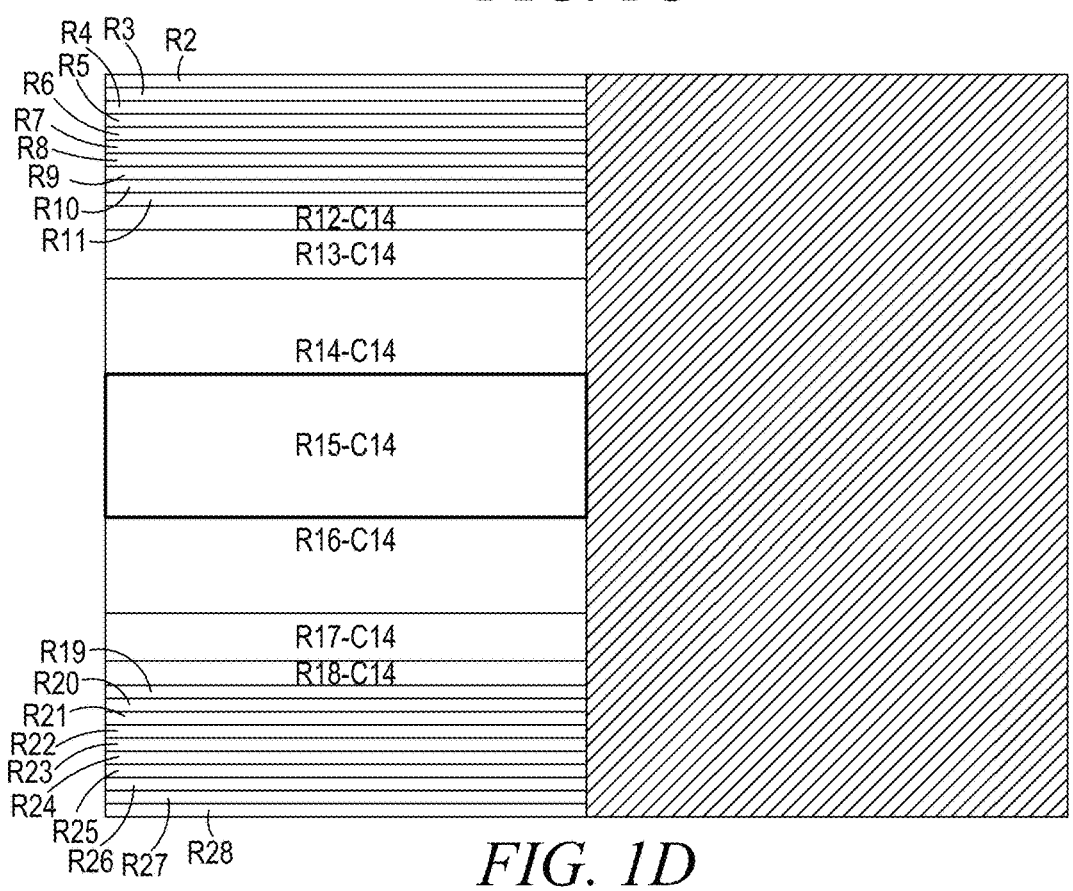

FIG. 1D illustrates an example modification of the section assuming that column 14 was selected for scrolling and that cell R15-C14 was selected as a starting point for scrolling, according to one embodiment. The cells within the selected column are presented in a non-linear fashion (sizes vary). As illustrated, the selected cell (R15-C14) is centrally located and the cells that extend therefrom in each direction decrease in size as they get farther from the selected cell. The columns (e.g., column 15) that were not selected for scrolling are deemphasized (e.g., representation removed, faded to black).

Figure 1E:
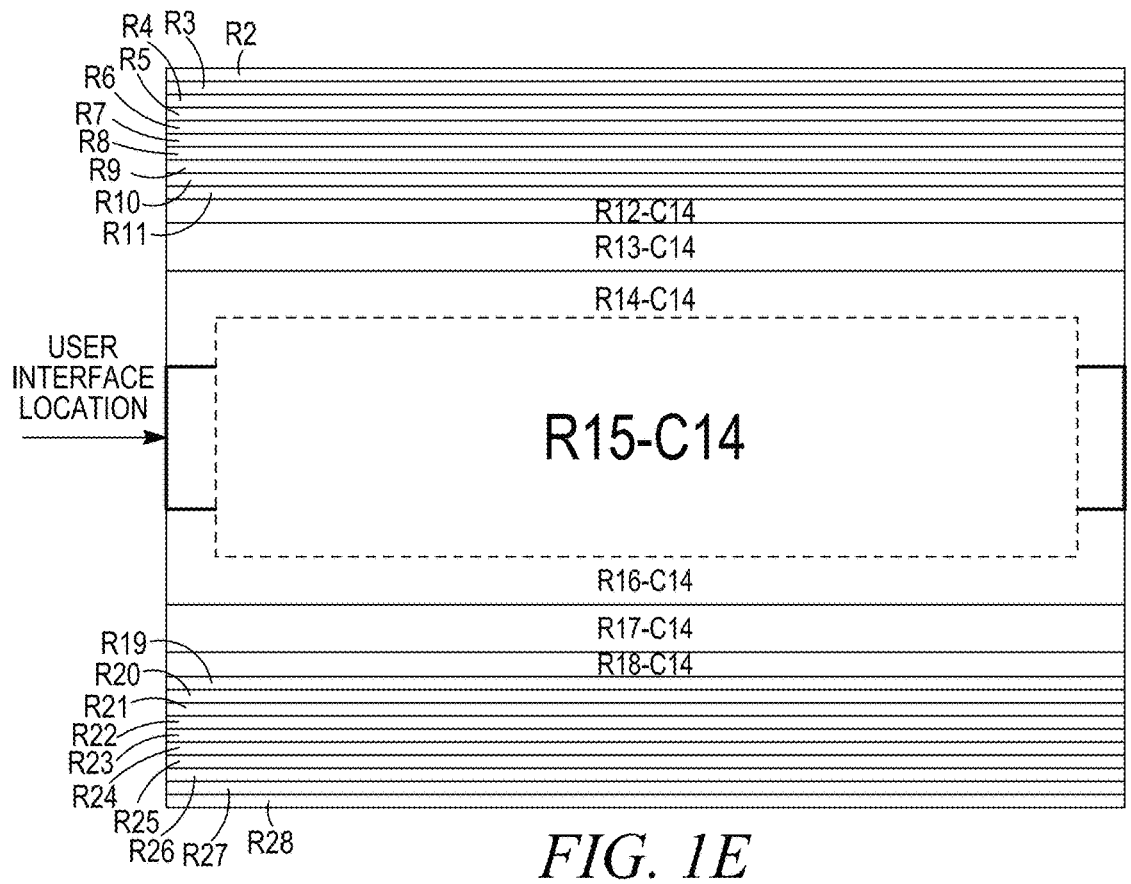
Figure 1F:
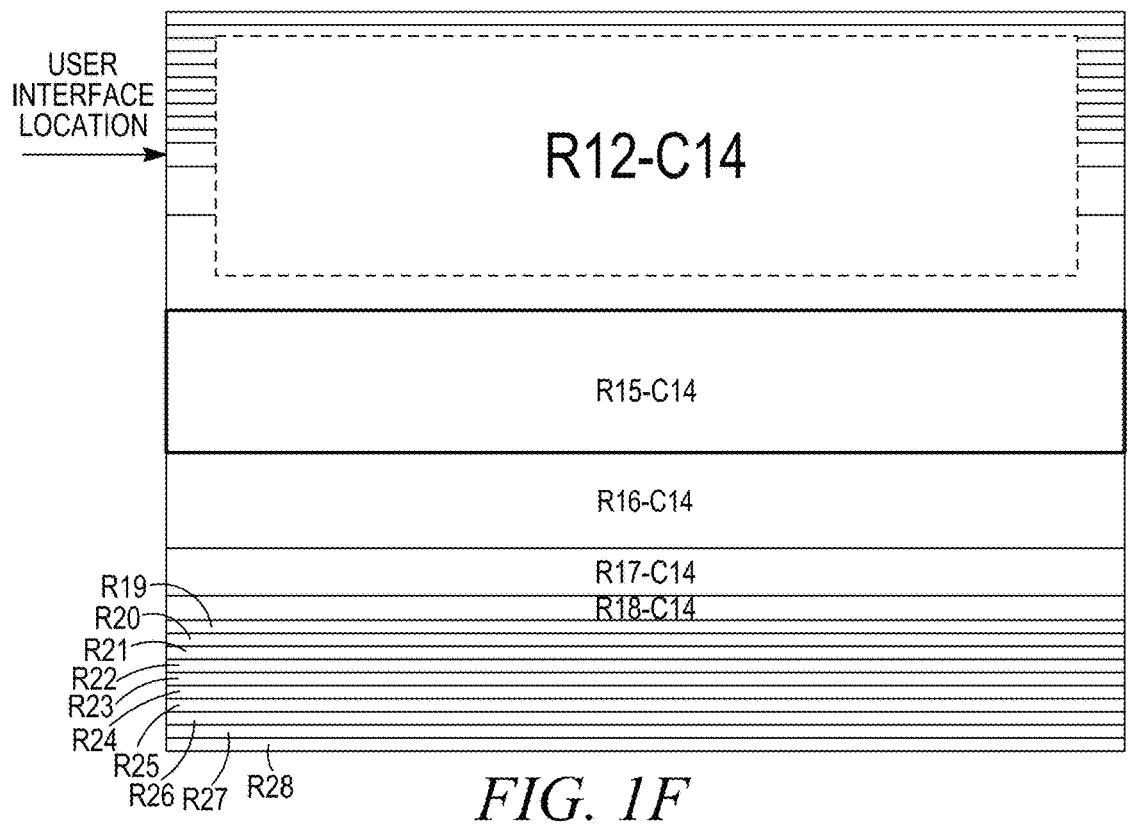

FIG. 1E-F illustrate example non-linear scrolling through the modified content presented in FIG. 1B, according to one embodiment. As illustrated, when performing non-linear scrolling the representation presented in a cell that is currently being scrolled over (location of the user interface) is enhanced (e.g., enlarged) so that the representation is readily visible to a user. The enhancement enables a user to accurately scroll in an accelerated fashion. FIG. 1E illustrates the selected cell (R15-C14) being enhanced while FIG. 1F illustrates a cell R12-C14 being enhanced.

Figure 1G:
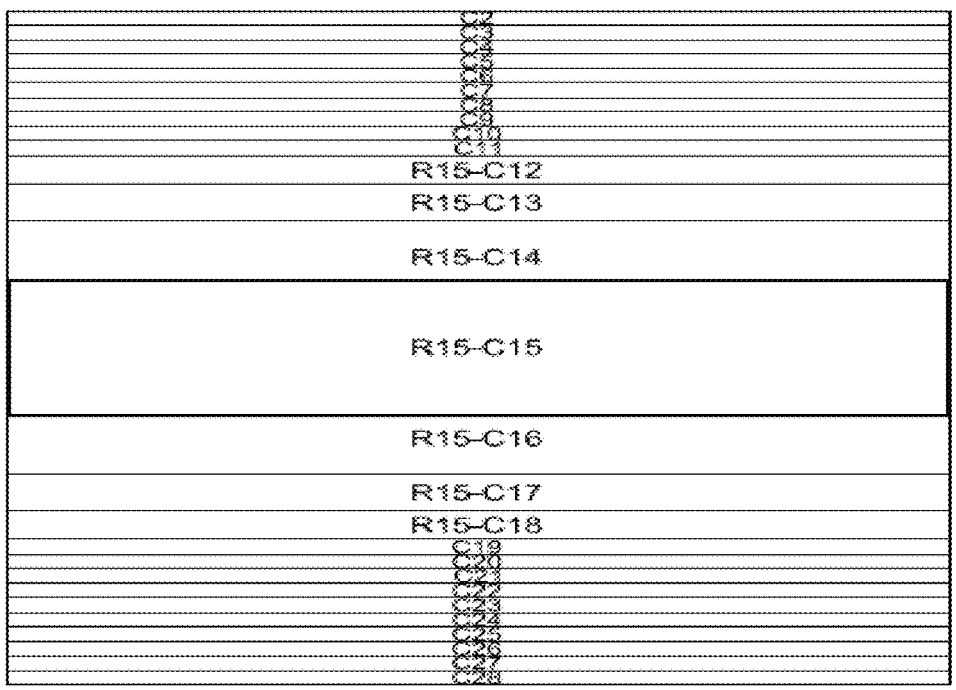

FIG. 1G illustrates an example modification of the section assuming that row 15 was selected for scrolling and that cell R15-C15 was selected as a starting point for scrolling, according to one embodiment. As illustrated, each cell (column) in the selected row extends across the entire display such that the other rows (rows 14 and 16) are not visible. The cells within the selected row are presented in a non-linear fashion (sizes vary). As illustrated, the selected cell (R15-C15) is centrally located and the cells that extend therefrom in each direction decrease in size as they get farther from the selected cell. The representation within each cell may be deemphasized (e.g., get smaller, fade to black) as the cells get farther from the selected cell.

Figure 1H:
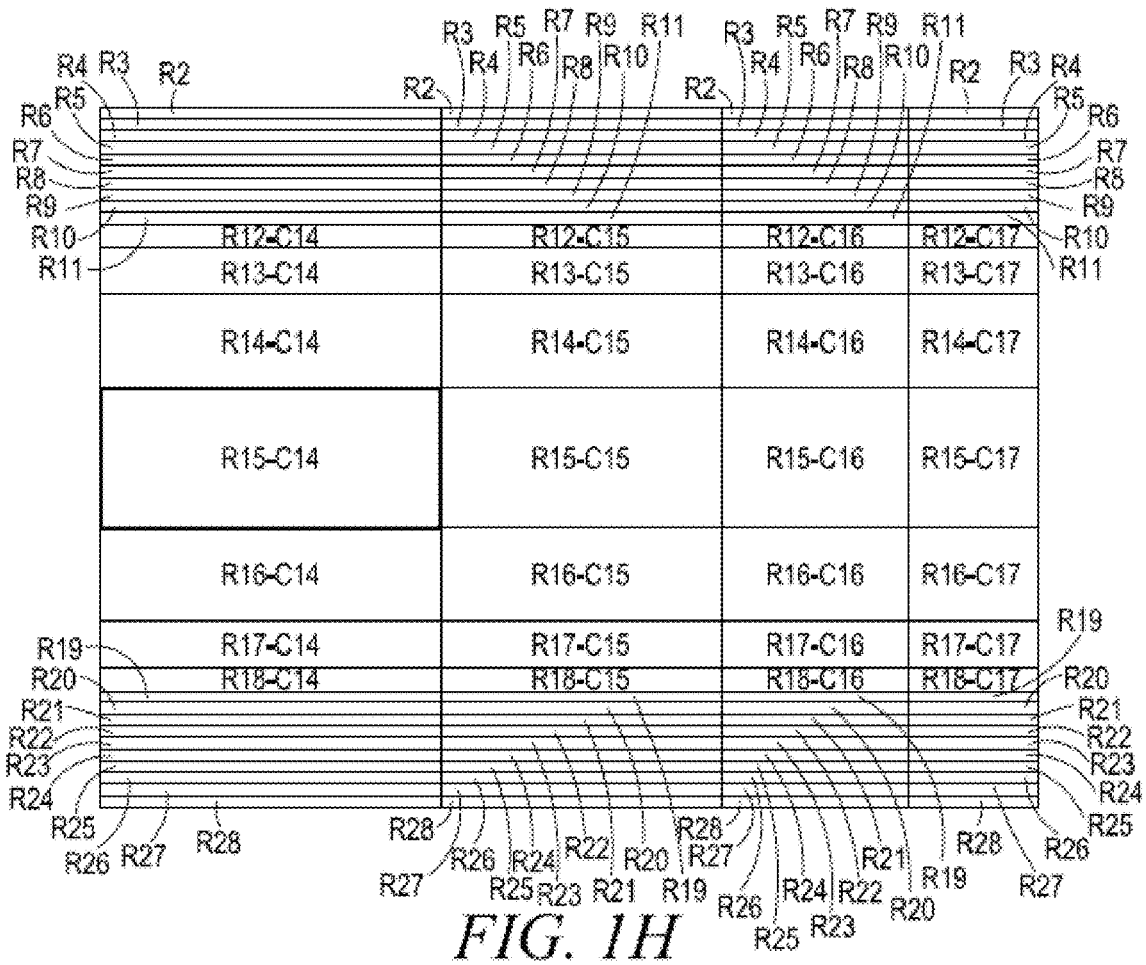

FIG. 1H illustrates an example modification of the section assuming that row 15 and column 14 were selected for scrolling and that cell R15-C14 was selected as a starting point for scrolling, according to one embodiment. The cells (columns) within the selected row and the cells (rows) within the selected column are presented in a non-linear fashion (sizes vary). As illustrated, the cells extending away from the selected cell in the selected column and the selected row decrease in size as they get farther from the selected cell. The representation within each cell may be deemphasized (e.g., get smaller, fade to black) as the cells get farther from the selected cell. A user may scroll by column or row by moving the user interface in an appropriate direction.

In an embodiment, scrolling with non-linear effects may be provided in an EPG. Some embodiments are implemented on a computing device that has a touch screen; others are operable using a gestural interface in 2D or 3D, a mouse, a touchpad, or other kinds of pointing device. Aspects of an embodiment can be provided in a computing device such as a tablet, smartphone, or other mobile device, or other type of portable or desktop computer, or in a server providing video or visual elements to a display device or a client computing device.

Figure 2A:
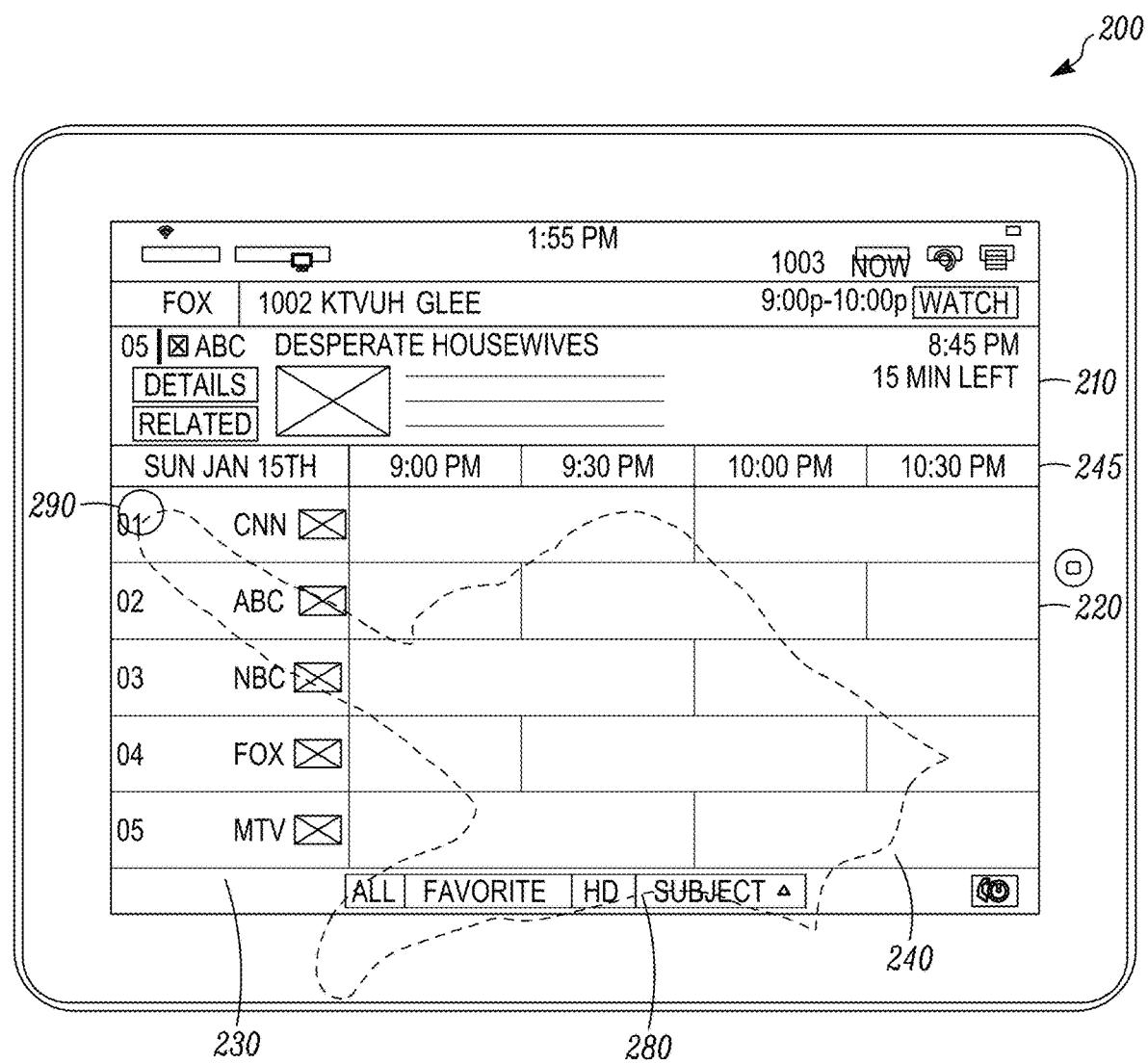
FIGS. 2A-F illustrate different screen shots of an example display utilizing non-linear scrolling, according to an embodiment.

FIGS. 2A-F illustrate different screen shots of an example EPG display 200 utilizing non-linear scrolling, according to an embodiment. FIG. 2A illustrates the example EPG display 200 in a normal operation mode. The EPG display 200 is displaying a portion of channels or content provided by a cable TV, satellite TV, Internet service provider, or other service provider that may be available to the user. The EPG display 200 includes an information area 210 (illustrated as upper portion, approximately upper 20%) and a grid guide 220 (illustrated as lower portion, approximately lower 80%). The information area 210 may show, for example, information about a currently playing program or a currently selected channel, navigation information, and the like. In the depicted example, the information area 210 includes, among other information, a channel numbered "05" and labeled "ABC", and a currently playing or selected program labeled "Desperate Housewives" that has 15 minutes left as of the current time of 8:45 PM.

The grid guide 220 may include a plurality of columns and rows identifying channels and programs available on those channels. As illustrated, the grid guide 220 includes a channel area 230 and a program area 240. The channel area 230 displays at least one column of information identifying the channels. As illustrated, the channel area 230 includes channel number and network ID as the identification information. The channels are displayed along a vertical axis (each channel associated with a row). The channel area 230 only displays a subset of the available channels. The subset is the amount of channels (number of rows) that can legibly be fit into the grid guide 220. As illustrated, a total of five channels (01 through 05) are included within the channel area 230 of the grid guide 220. The subset is likely a small percentage of the number of channels that are available as many systems may include hundreds or even thousands of channels.

The program area 240 includes a plurality of rows equal in number to the number of rows in the channel area 230. The rows in the program area 240 are associated and aligned with rows in the channel area 230. The program area 240 may include a plurality of columns associated with different time intervals (e.g., each column may represent a half-hour time block). An initial row 245 of the program area 240 may identify the time intervals. The time intervals initially presented may be based on the current time. For example, the first time interval may include the current time or may be a next time interval after the current time. As illustrated, the first time interval (9:00 PM) is a next time interval after the current time (8:45 PM as identified in the information area 210). The number of time intervals displayed is based on what can legibly be fit into the grid guide 220. As illustrated, four half-hour time intervals (9:00 PM-10:30 PM) are included within the program area 240 of the grid guide 220.

Each row in the program area 240 may identify the programs that are available for the associated channel for the different time intervals. For ease of illustration, the program identification (e.g., name of program) is not included in the program area 240. Rather, the individual programs are simply illustrated as empty boxes. A program that runs for more than one time interval may include the program identification in multiple columns. For example, CNN includes a program that runs from 9:00 to 10:00 so the box representative of the program (and the program identification if it was illustrated) is extended over the 9:00 and 9:30 time intervals.

In order to explain and illustrate the non-linear scrolling functionality of the EPG, the present discussion will assume that the EPG is being presented on a display having a touch screen interface (a touch screen display). For example, the EPG may be presented on a tablet computer, a smartphone, and the like. A user may interact with the EPG, for example, using the tip of a finger. As illustrated, a hand 280 of the user will typically be poised above the display during input, in a position likely to conceal a portion of the display from the user. However, for illustrative purposes, the position of hand 280 is represented in the figures without concealing the display. In order to scroll through the channels on the EPG 200 in a non-linear fashion a user may select a channel from channel area 230 by making contact (e.g., at a fingertip) with the display at a point of contact 290 within one of the channel identification columns for the channel. As illustrated, the user's finger makes contact with channel 01 (channel 01 is the point of contact 190) which is the channel number for CNN network.

According to one embodiment, once the user touches and holds their finger on the channel for a defined amount of time (establishes the contact point 290) the EPG 200 may initiate non-linear scrolling of channels on the EPG 200. The amount of time that the user needs to maintain contact can be a configurable parameter. The channel that the user selects for non-linear scrolling may become associated with a point of inflection for the non-linear scrolling. The point of inflection is the point from where non-linear effects are implemented and will be described in more detail later.

Figure 2B:
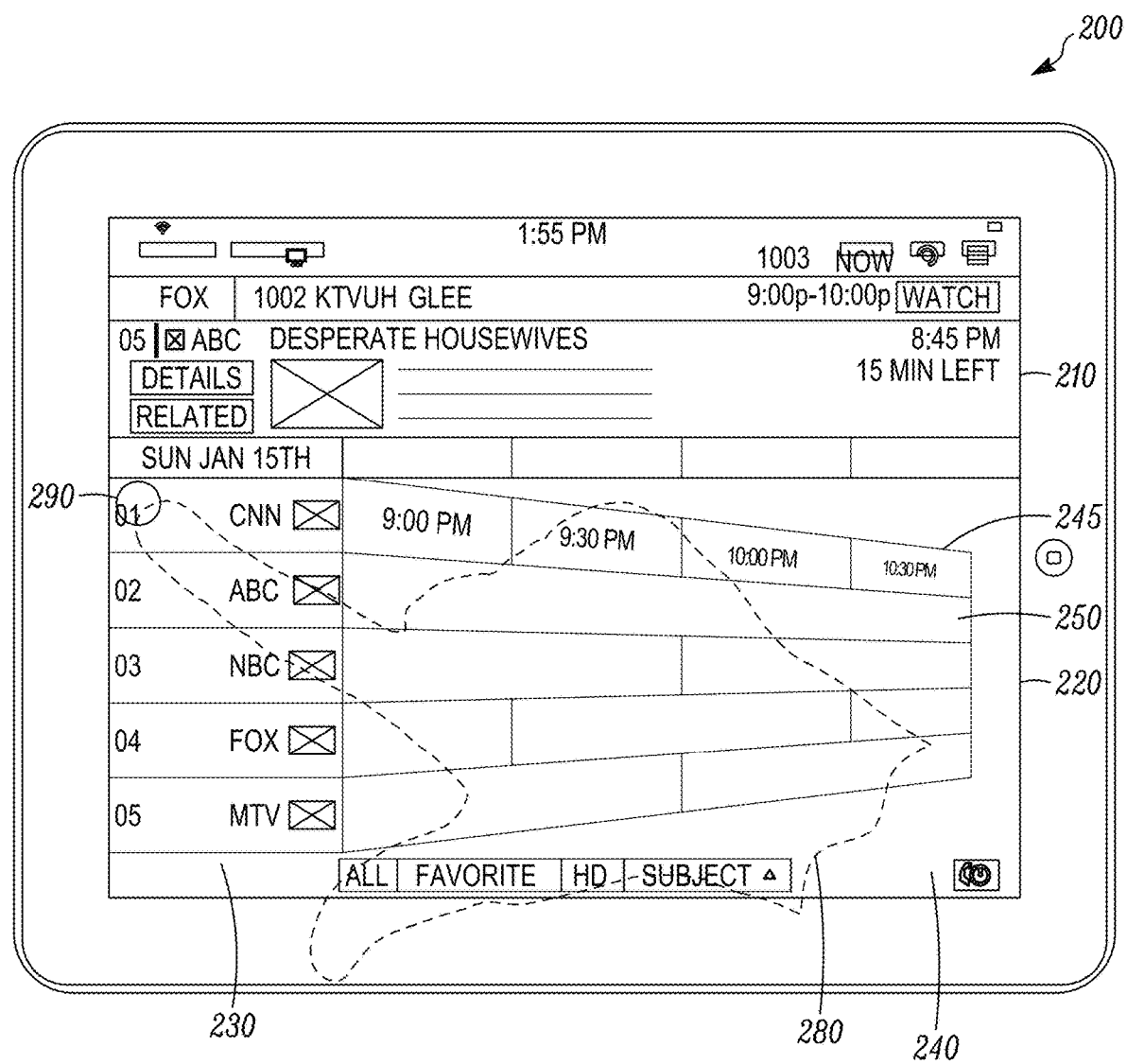

FIG. 2B illustrates the example EPG display 200 preparing to enter a non-linear channel scrolling mode. If additional channels are going to be presented in a non-linear fashion for the user to scroll through looking for a certain channel it is likely the user is not concerned with programs being presented on the various channels in the different time slots. Accordingly, when entering the non-linear scroll mode for information in the channel area 230 the information presented in the program area 240 may, in some embodiments, be removed, deemphasized (e.g., faded, placed in background) and/or disassociated with the channel area 230. As illustrated, a far edge 250 of the program area 240 (last time slots illustrated) is rotated away from an edge of the grid guide 220 such that it appears to be going into the display. The time slots further away from the current time may also be faded.

Figure 2C:
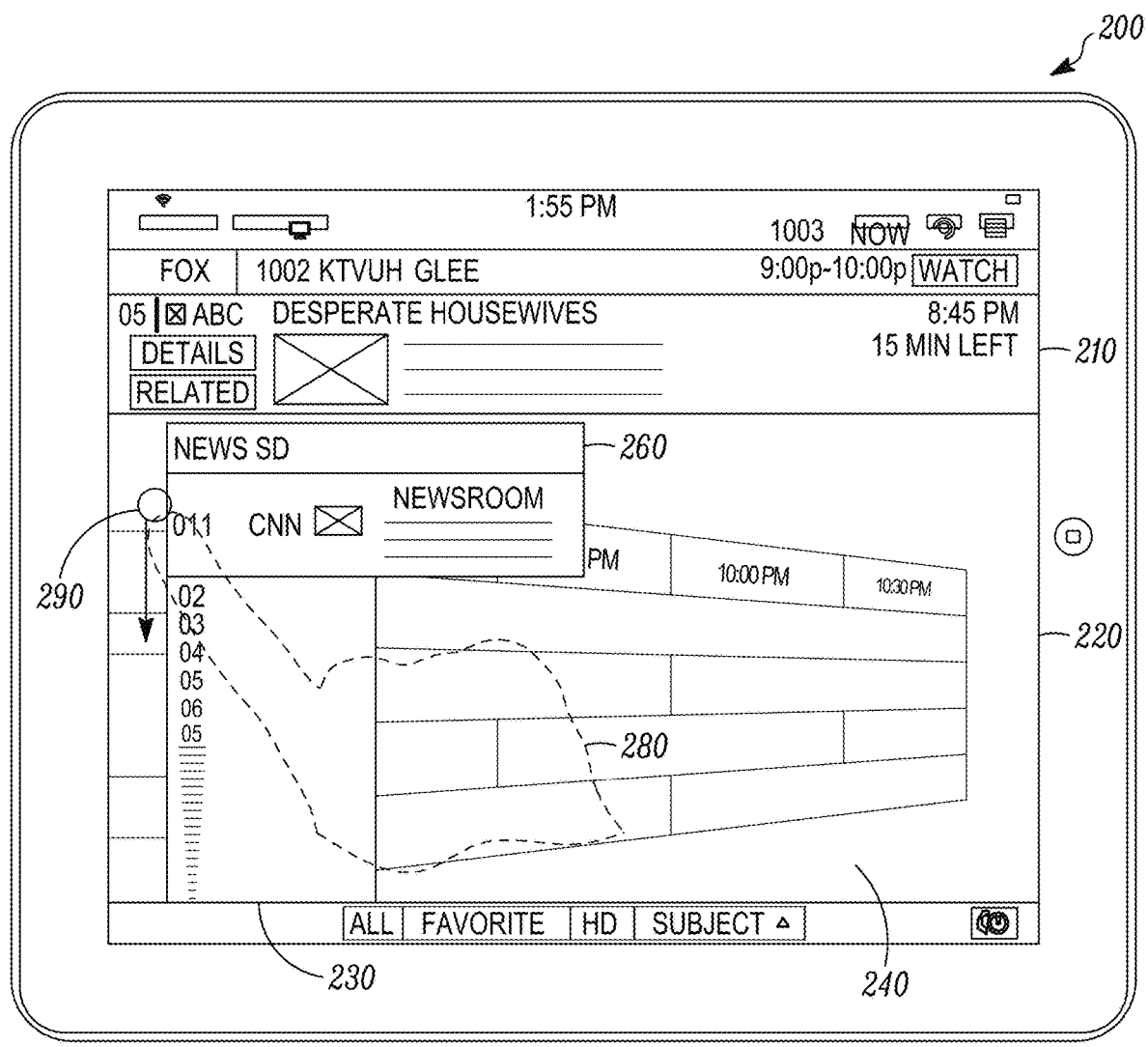

FIG. 2C illustrates the example EPG display 200 as it has entered a non-linear channel scrolling mode. The program area 240 may be further deemphasized. The channel area 230 may now present many more channels than it previously presented. According to one embodiment, all of the available channels may be displayed. In order to fit more channels the size of the rows associated with and presenting the channel data must be reduced from the size of the rows in normal operation when only a few rows were presented so the data contained therein was legible. The selected channel (01) may be the point of inflection for the non-linear effects on the data presented and the non-linear scrolling created thereby.

The selected channel may be assigned a row height and the size of the other rows (possibly in both directions) may be reduced such that the farther the rows are away from the selected channel (e.g., channel 01) the smaller they are. The point of inflection may be a starting point (and possibly center point) for various non-linear algorithms providing non-linear effects and scrolling (various examples will be discussed later). As illustrated, the user selected an initial channel (01) from a top row of the channel area 230 so that the row for channel 01 is illustrated at the top of the channel area 230 and the rows for the other channels are illustrated below that with decreasing row heights. In this illustrated example, a user can only initially move their finger in a downward direction to scroll through increasing channel numbers.

As the rows get smaller the data presented in the rows may get smaller and become more difficult to read and may eventually become illegible. According to one embodiment, the rows a certain distance away from the selected row may not even present channel information. While the data may not be legible or presented for some of the rows in the channel area 230, the rows are still associated with a channel. The information for the channel selected (e.g., channel 01 was originally selected) may be magnified and presented in a magnified window 260 so that the channel information is readily visible. As illustrated, the magnified window 260 may extend into the program area 240 and may include additional information (e.g., header defining as a news channel, and text to right of envelope providing additional details about the channel).

The user may scroll through channels on the EPG 200 by moving their finger along the channel area 230 (changing the contact point 290). The channel the users finger is associated with (the row the users finger is over) at any point during the scrolling may be magnified and presented in the magnified window 260 so the user will be aware what channel they have currently scrolled to. The scrolling from one channel to the next occurs once the users finger moves from a row associated with one channel to a row associated with a new channel. As the size of the rows may decrease the further away from the selected channel it is, the scrolling from one channel to the next may occur with less movement of the finger the farther away from the selected channel. By way of example, it may take the user a movement of sixty pixels on the display to scroll from the selected channel (01) to a next channel (02) while it may only take ten pixels to scroll from a channel 07 to a channel 08 (going from six rows from selected channel to 7 rows).

When scrolling from the initial channel (e.g., channel 01), a small movement of the finger may result in scrolling to (and magnification of) a channel close to the original channel while a large movement may result in scrolling to (and magnification of) a channel farther away. The use of the non-linear scrolling and the magnification may allow the user to scroll to channels in close proximity to the originally selected channel with fine granularity while also enabling the user to scroll many (e.g., hundreds of) channels quickly and accurately as they will be able to see where they are with the scrolling. By way of example, a movement of a user's finger of 60 pixels on the display from the selected channel (01) may scroll a single channel (02) while a movement of 240 pixels from the selected channel may scroll 100 channels.

Figure 2D:
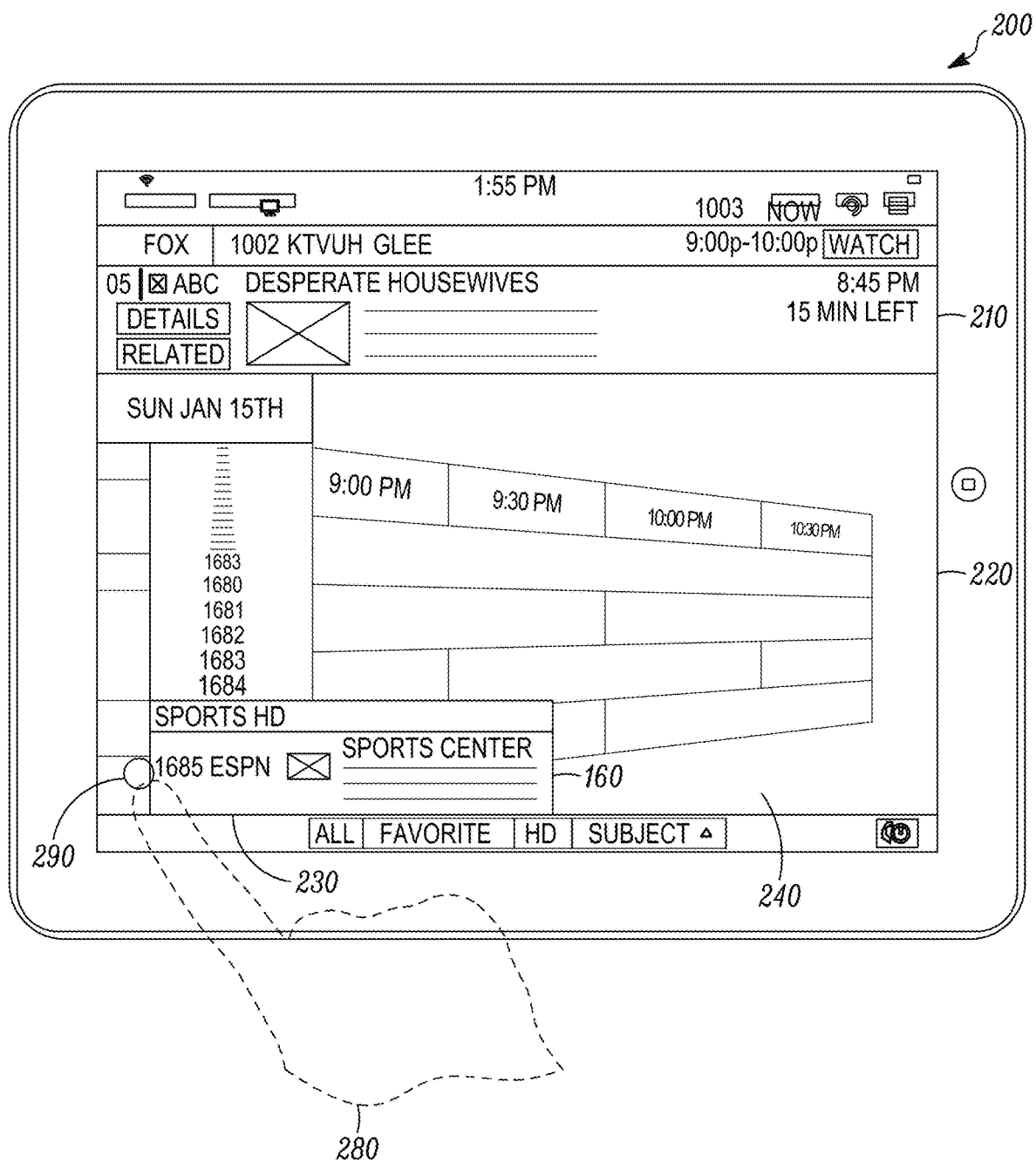

FIG. 2D illustrates the example EPG display 200 where the user has scrolled down the channel area 230 such that channel 1685 associated with ESPN is presented in the magnified window 260 (channel 1685 is the point of contact 290). The non-linear scrolling of channels enabled the user to run their finger from the top of the channel area 230 to the bottom of the channel area 230 and scroll from channel 01 to channel 1685. According to one embodiment, the range of channels available on the EPG display 200 may be from 01 to 1685 so that a user can scroll through the entirety of the available channels to the EPG display 200 by scrolling their finger over the entire height of the channel area 230. The use of the magnified window 260 enabled the user to know where there were with regard to scrolling as the user moved their finger down the display.

According to one embodiment, once the user removes their finger from the channel area such that there is no contact point 290, the EPG 200 may return to normal operations centered around the channel the user's finger was removed from.

Figure 2E:
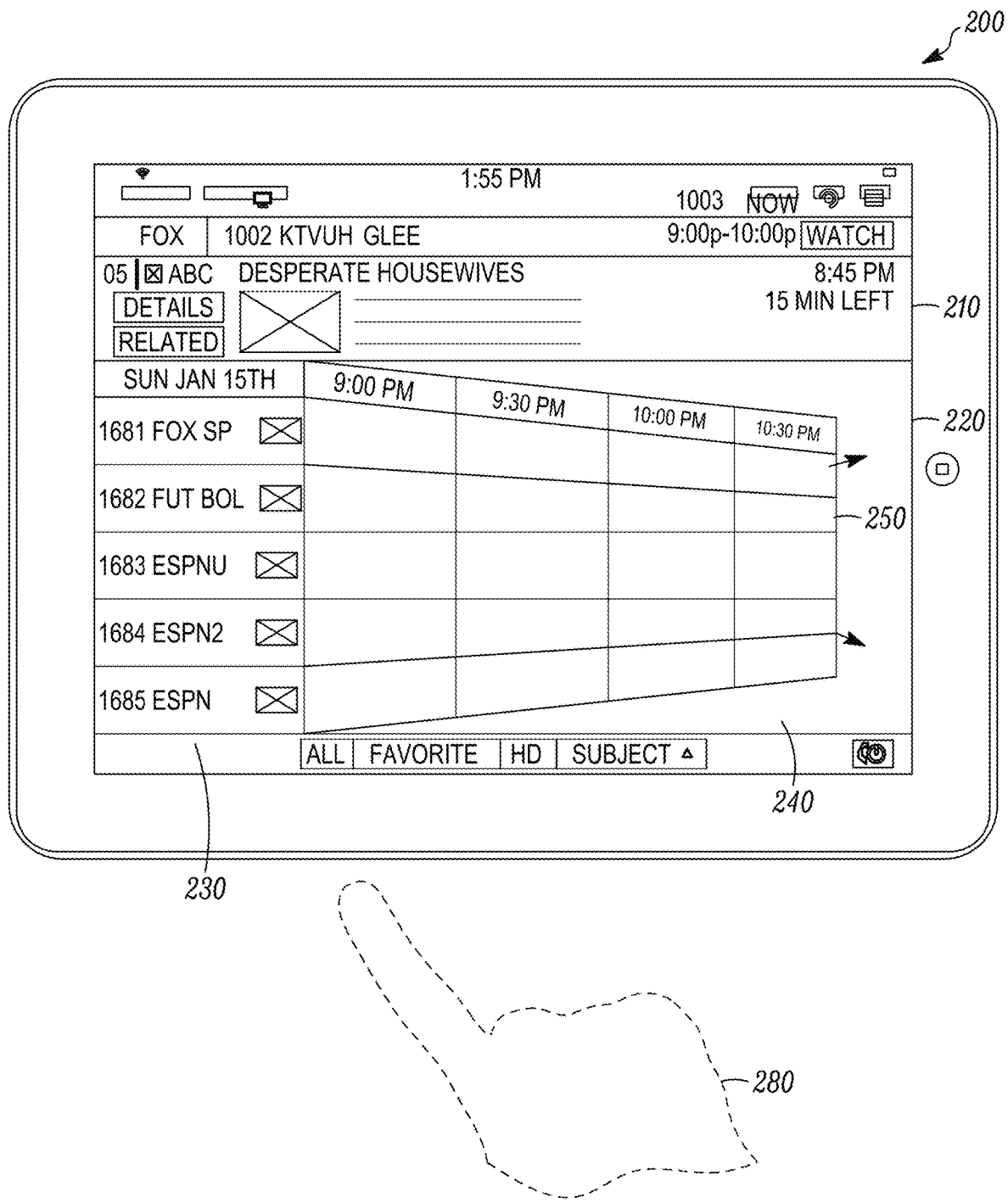

FIG. 2E illustrates the example EPG display 200 once the user removes their finger (lifts from the screen). As illustrated, the channel area 230 reverts back to displaying channel identification information (e.g., channel number and network ID) in equally sized rows for a subset (e.g., 5) of the available channels including the channel the users finger was removed from (channels 1681-1685). The program area 240 which had been deemphasized is starting to return to normal operation as well. The far edge 250 of the program area 240 (last time slots illustrated) is rotated back toward the edge of the grid guide 220.

Figure 2F:
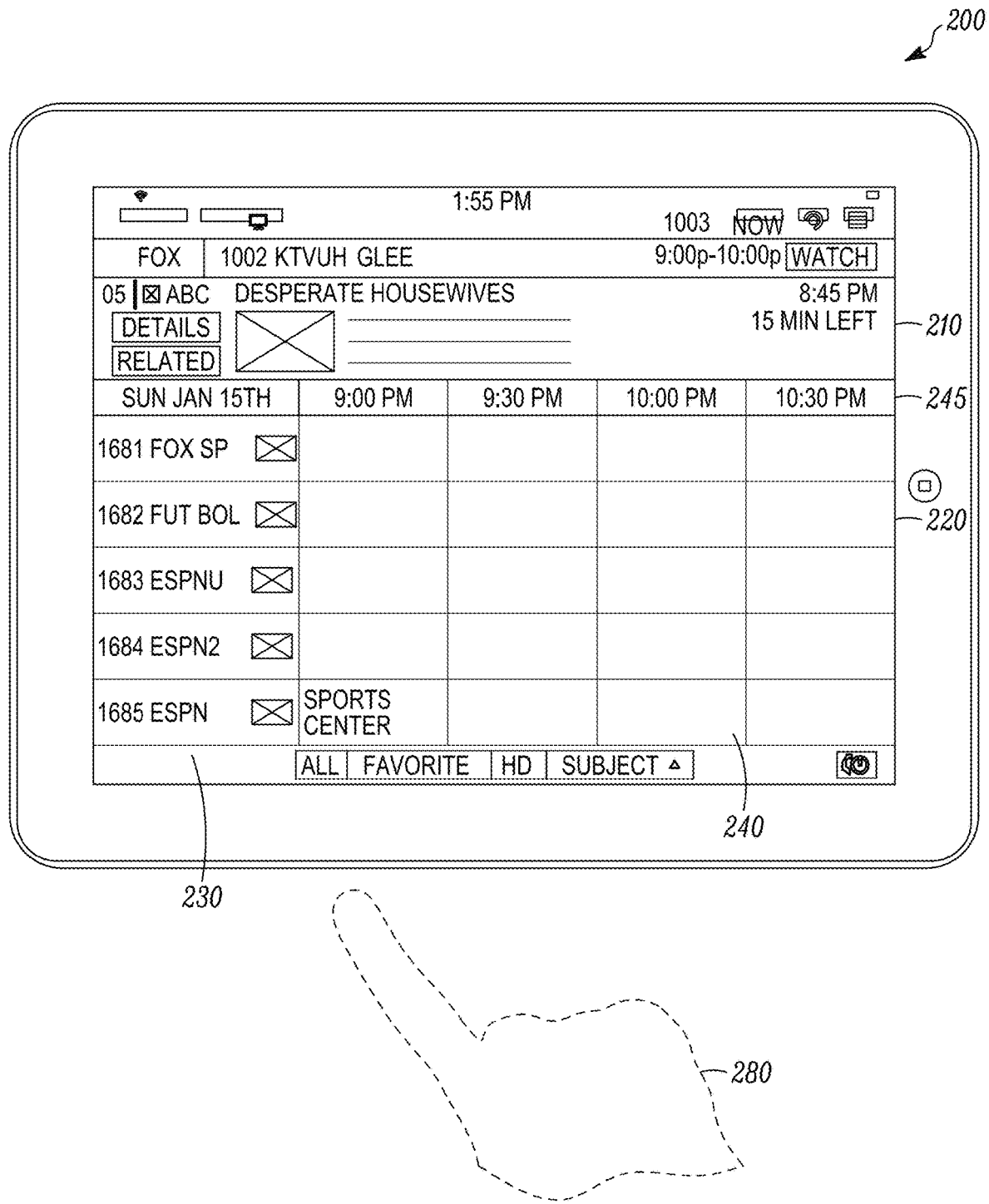

FIG. 2F illustrates the example EPG display 200 back in normal operation including the display of programming associated with the scrolled to channel (1685).

Figure 3A:
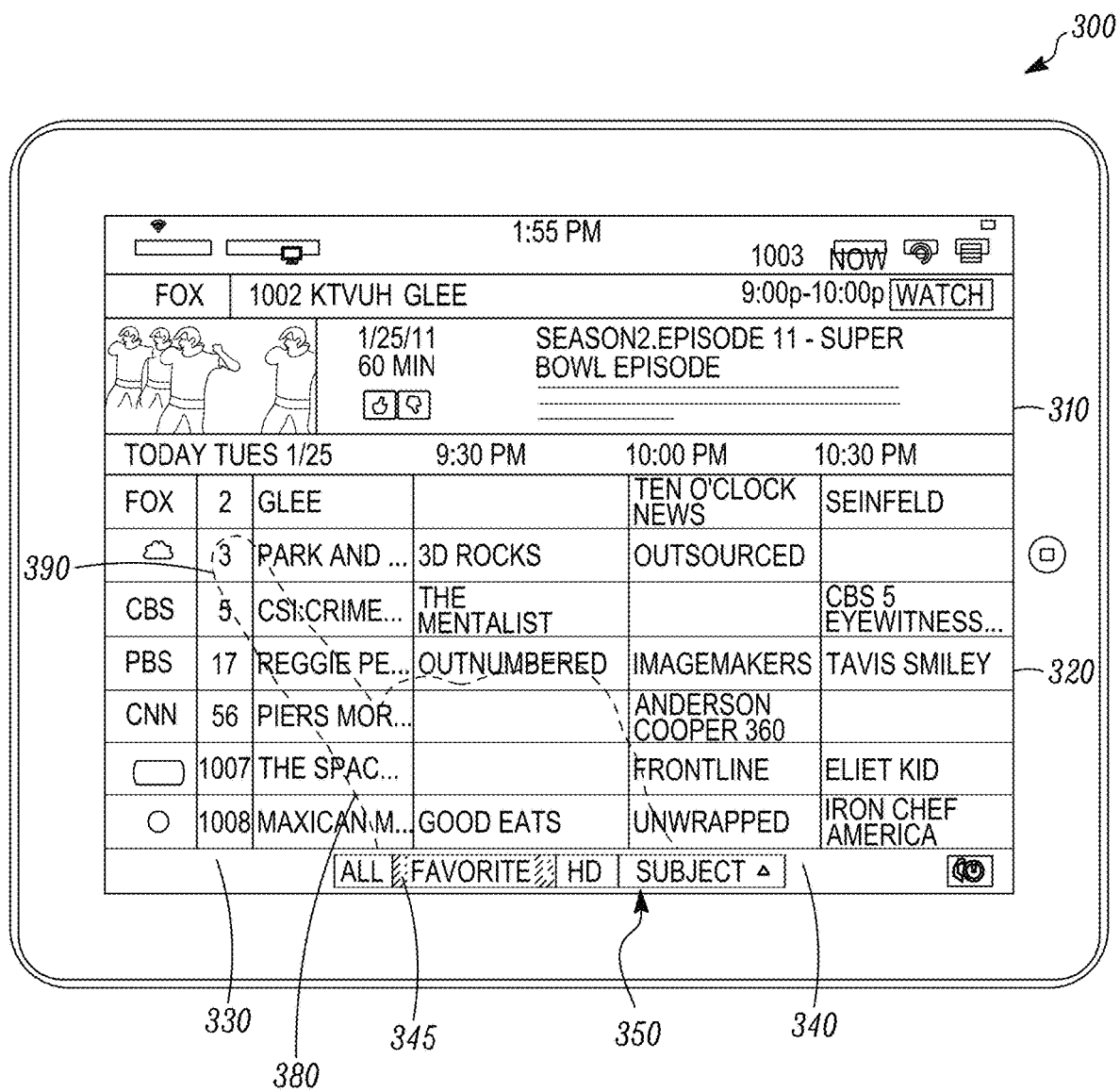
FIGS. 3A-C illustrate different screen shots of an example display utilizing non-linear scrolling, according to an embodiment.
Figure 3B:
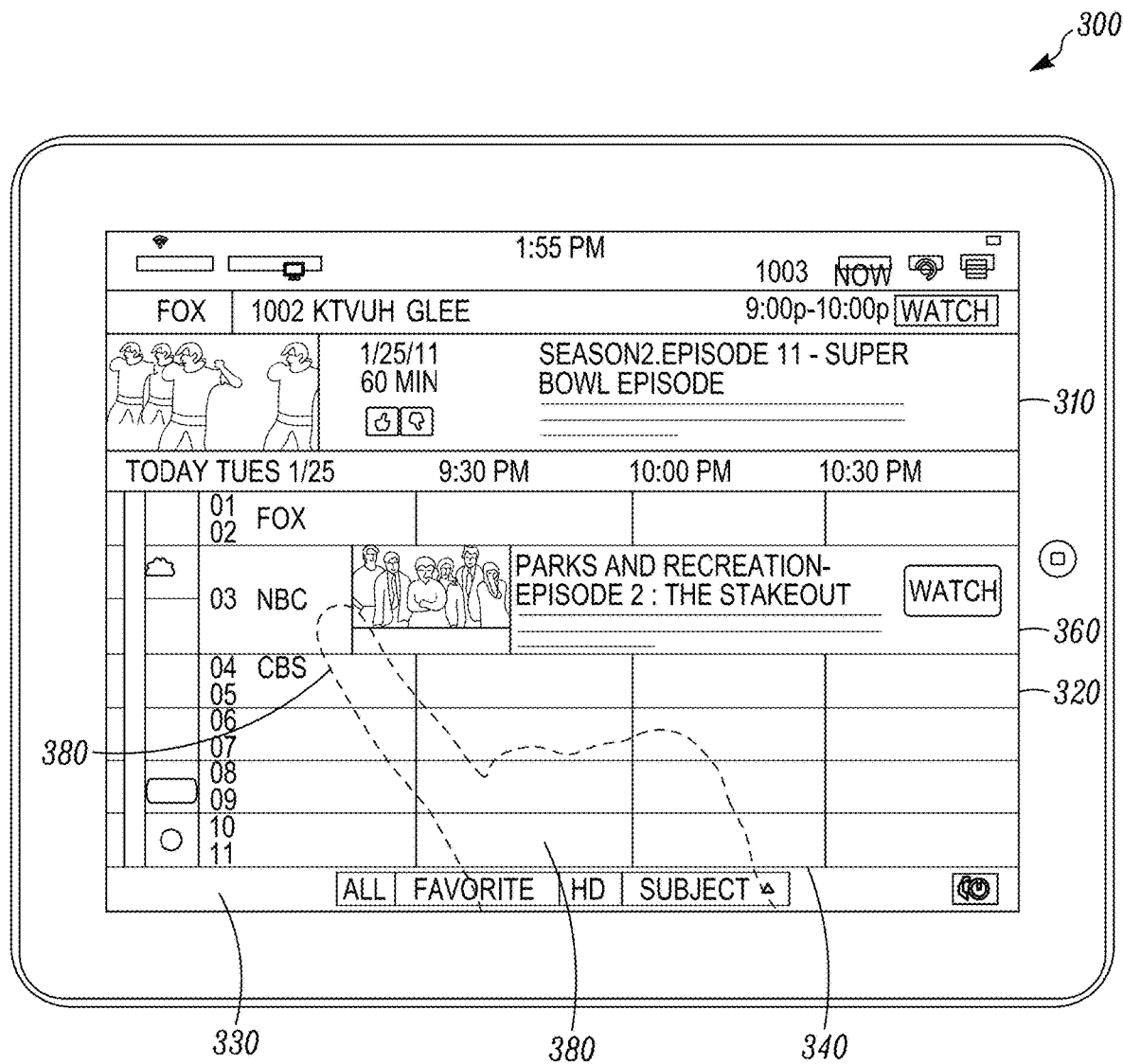
Figure 3C:
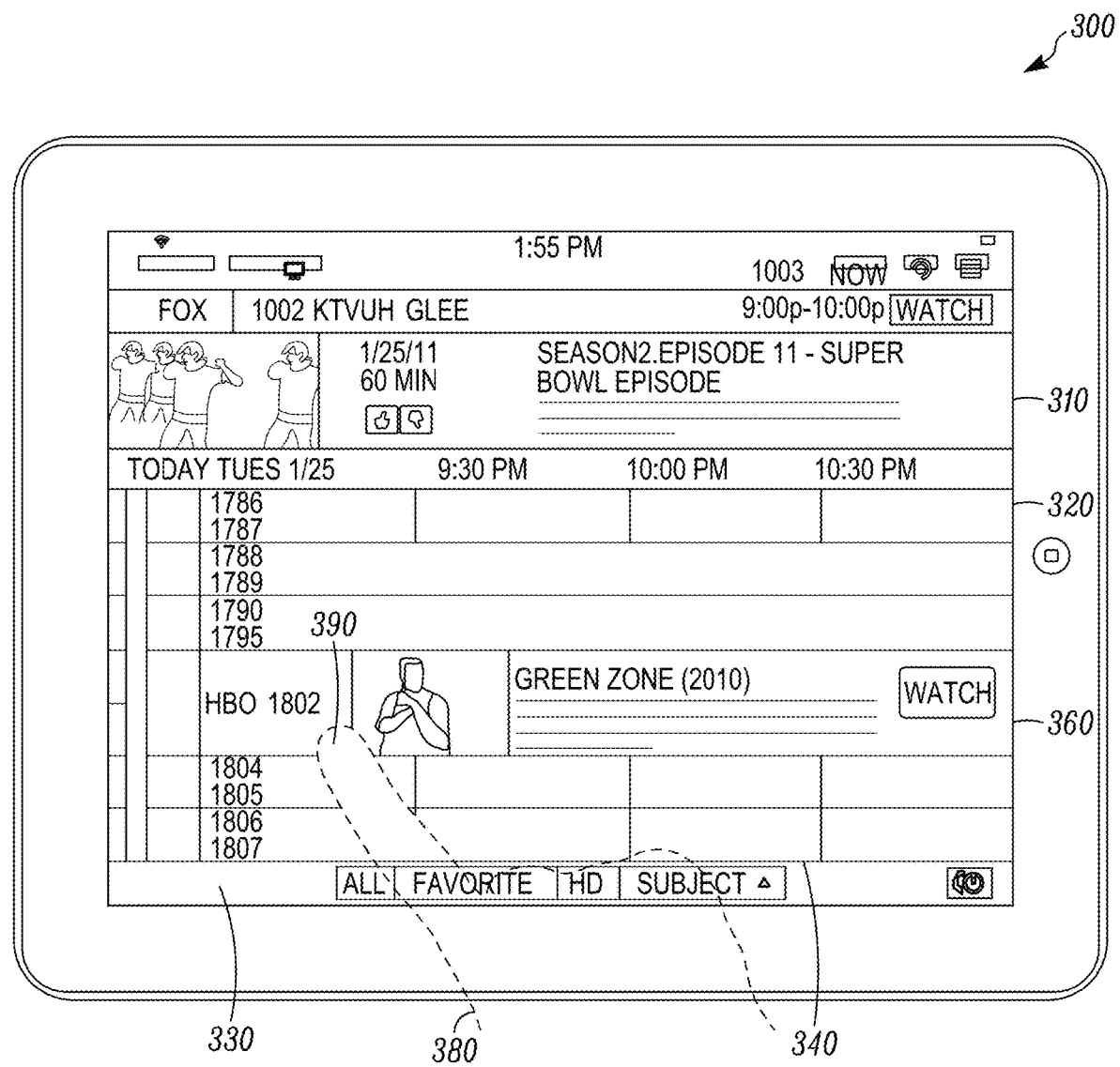

FIGS. 3A-C illustrate different screen shots of an example EPG display 300 utilizing non-linear scrolling, according to an embodiment. FIG. 3A illustrates the example EPG display 300 in a normal operational mode. The EPG display 300 includes an information area 310 providing information about a currently playing program or a currently selected channel and a grid guide 320 displaying a plurality of columns and rows identifying channels and programs available on those channels for different time intervals. The grid guide 320 includes a channel area 330 and a program area 340. The channel area 330 displays network identifier (e.g., logo and call letters) and channel number for a subset of the available channels (7 channels illustrated). The subset is the amount of channels (number of rows) that can legibly be fit into the grid guide 320. The program area 340 may identify programs that are available for the associated channel for different time intervals (e.g., half-hour blocks of time) that are identified (four time intervals illustrated, the current time interval and the next three time intervals). It should be noted that the channels illustrated appear to arbitrarily jump (2, 3, 5, 17, 56, 1007, 1008) rather than increase incrementally. This is because the EPG is displaying at least a subset of the user's favorite channels (indicated by a favorites tab 345 being highlighted in a selection bar 350 along lower edge of the display 300).

A user may initiate non-linear scrolling of the EPG 300 by moving their hand 380 over the display 300 and making contact (e.g., with a fingertip) with one of the channels at a point of contact 390 in the channel area 330. As illustrated, the user's finger is contacting channel 03 (channel 03 is the point of contact 390) which is associated with NBC.

FIG. 3B illustrates the example EPG display 300 as it has entered a non-linear channel scrolling mode. The content within the program area 340 is removed. The channel area 330 may now present many more channels than in normal operation by reducing the size of the rows. All of the channels may be illustrated in the non-lineal scrolling mode rather than just the favorites that were being displayed. The channel area 320 may include rows for all the channels available to the EPG 300 or if the number of channels available to the EPG 300 is too large may include a large subset of the channels. That is, if the number of channels available is too large the size of the rows would have to be so small that movement between the rows could not easily be detected as the smallest movement of the user's finger could cause the channel selected to jump back and forth.

The selected channel (channel 03) may the point of inflection for the non-linear scrolling. The selected channel may be assigned a row height and the size of the other rows may be reduced such that the farther the rows are away from the selected channel (e.g., channel 03) the smaller they are. The point of inflection may be a starting point (and possibly center point) for various algorithms providing non-linear effects scrolling. As illustrated, the user selected the initial channel (03) for engaging non-linear scrolling from a second row of the channel area 230 so that additional rows are available on each side of the selected row (channel) so that the user can scroll in both directions. However, the amount of rows illustrated above and thus that the amount of scrolling that can occur in an upward direction is far less that the amount of scrolling that can occur in a downward direction.

The selected channel (e.g., channel 03) may be magnified and may include information, for example, about a currently playing program in a magnified window 360. The magnified window 360 may extend into the program area 340. The information about the currently playing program may be from the program area 340 (e.g., information that would be presented if you selected an information button about the program, information that would be displayed in the information window 310 if the program was selected and/or playing).

The size of the rows may be smaller the farther the rows are away from the selected channel (e.g., channel 03). The information presented in the rows of the non-linear scrolling mode may be different than the normal operation. For example, rather than displaying network identifier (e.g., logo and call letters) followed by the channel number it may display the channel number followed by a reduced information network identifier (call letters without the logo). As the rows get smaller the data presented in the rows may get smaller and the amount of data may be reduced. As illustrated, the channel number and network identifier (call letters) are displayed for the channels around the selected channel but as you get further away the selected channel the network identifier becomes lighter and then eventually is no longer displayed. The further you get from the selected channel the more difficult it is to read the channel number. According to one embodiment, the rows a certain distance away from the selected row may not even present the channel number. Each row is associated with a channel regardless of the size or amount of data that is presented in the row.

The scrolling from one channel to the next occurs once the users finger (contact point 390) moves from a row associated with one channel to a row associated with a new channel. As the size of the rows decrease as they extend away from the point of inflection (selected channel), the scrolling from one channel to the next (and the magnification of the channel) may occur with less movement of the finger the father away the users finger is from the from the point of inflection (selected channel). When scrolling from the point of inflection, a small movement of the finger may result in scrolling to (and magnification of) a channel close to the original channel (provide fine granularity in the scrolling to channels in close proximity to the point of inflection) while a large movement may result in scrolling to (and magnification of) a channel farther away.

FIG. 3C illustrates the example EPG display 300 as the user scrolls approximately half way down the channel area 320 where the point of contact 390 is channel 1802 associated with HBO, which is presented in the magnified window 360. The non-linear scrolling of channels enabled the user to scroll from channel 03 to channel 1802 by moving their finger (the point of contact 390) down roughly half the channel area 320. The use of the magnified window 360 enabled the user to accurately scroll to a desired channel.

When the user scrolls their finger down the screen (channel area 320) the size of the rows for the channels not currently under the users finger may remain the same (e.g., the further away from the originally selected channel the smaller) while the row for the channel currently being scrolled over is magnified and additional information is added to the selected in the magnified window 360.

As rows farther away from the point of inflection may be small the level of granularity provided is course as even slow small movements of the users finger may result in the scrolling through several channels. Accordingly as a user approaches the desired channel they may want increase the level of granularity they are provided in scrolling. According to one embodiment, if the user pauses on a particular row (channel) for a predefined amount of the time (may be a configurable parameter) the point of inflection may be recalibrated to the channel (row) the user paused on. Accordingly, the paused on channel (new point of inflection) may be assigned a row height and the size of the other rows may be reduced such that the farther the rows are away from the paused on channel the smaller they are. The user may now scroll to channels in close proximity with small movements of the user's finger (point of contact 290) and provide fine granularity in the scrolling centered around the new point of inflection.

FIG. 3C illustrates channel 1802 associated with HBO in the magnified window 360 and the rows extending in each direction therefrom getting smaller indicating that channel 1802 has been recalibrated as the point of inflection. Accordingly, a user may engage in non-linear scrolling from the new point of inflection (channel 1802). As channel 1802 is near the middle of the channel area 330 the user can scroll a fair amount in both directions.

According to one embodiment, once the user removes their finger from the channel area the EPG 300 may return to normal operations centered around the channel the user's finger was removed from.

Figure 4:
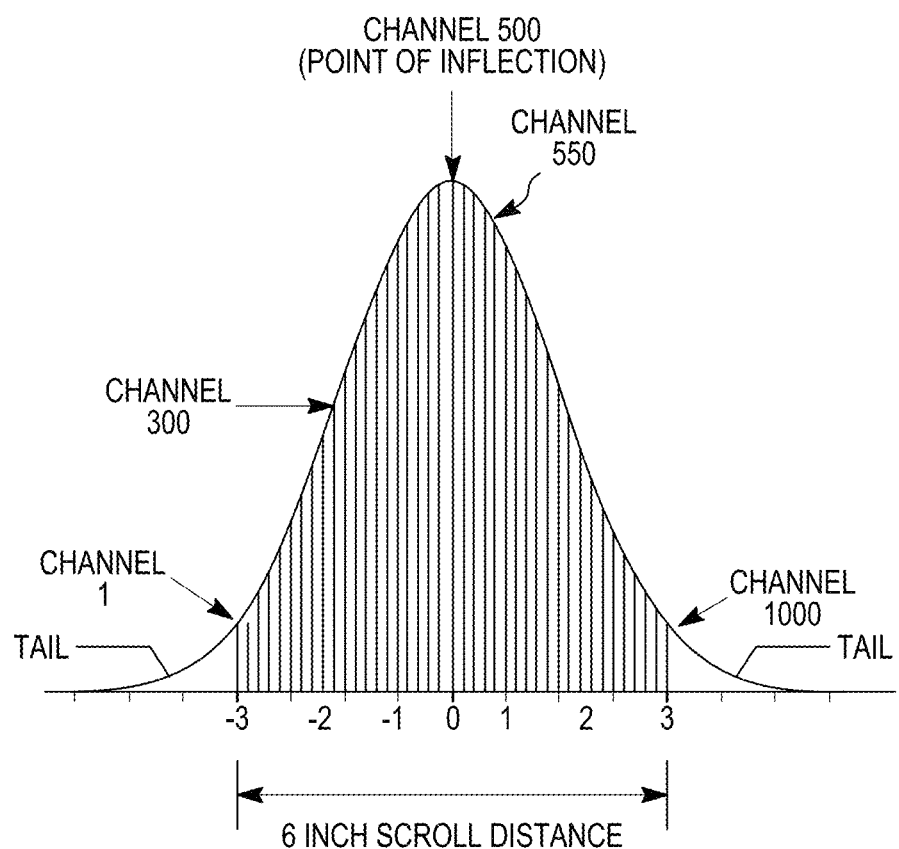
FIG. 4 illustrates an example graph of a non-linear scrolling implementation, in accordance with an embodiment.

FIG. 4 illustrates an example graph of a non-linear scrolling implementation, in accordance with an embodiment. The graph is a bell curve centered on the point of inflection. The graph illustrates channels along the x-axis and height of rows (e.g., in pixels) for the channels along the y-axis. The point of inflection is illustrated as channel 500 and the bell curve traverses from channel 01 to channel 1000. The row height peeks at the point of inflection (channel 500) and are reduced in each direction based on distance from the point of inflection. It should be noted that no channels are associated with the tails of the bell curve as the height of any rows at that point would be so small that the slightest movement of a user's finger could cause the EPG to bounce back and forth between multiple channels. The bell curve may be configured based on the total number of channels available and the scrolling distance of the program area.

The bell curve may be utilized in an EPG to present channels 1-1000 (possibly all the available channels) when it is operating in non-linear scroll mode. The bell curve illustrates how a user must move their contact point on the EPG screen a larger distance to scroll to a next channel when they are in close proximity to the point of inflection (provide fine granularity of scrolling) than they do as they get farther away from the point of inflection (provide fast scrolling). Likewise, a movement of a certain distance will scroll less channels in close proximity to the point of inflection than it will a further distance away from the point of inflection. As the user moves their contact point along the EPG they are traversing the rows in accordance with bell curve.

FIG. 4 further illustrates a scroll distance from the point of inflection along the x-axis. By way of example the scroll distance is illustrated as six inches (an EPG display is capable of scrolling over a six inch area). According to one embodiment, a tablet computer may be capable of providing a six inch scroll area. As illustrated, the scroll distance assumes that the point of inflection is at the center of the EPG display and maps out 3 inches in each direction. The three inches in each direction ends at the beginning of the tails indicating that portion of the bell curve is not utilized. As the rows decrease in size as they extend from the inflection point, the number of channels between the inflection point and the 1 inch scrolling distance in each direction will include the least channels and the scrolling distance between 2 and 3 inches in each direction from the inflection point will include the most channels.

By way of example, the channel associated with the +1 inch scroll distance (⅓ of the scrolling distance in the upward direction) is channel 550 (10% of the channels to be scrolled in the upward direction). The channel associated with the −2 inch scroll distance (⅔ of the scrolling distance in the downward direction) is channel 300 (40% of the channels to be scrolled in the downward direction). Utilizing these example numbers, 10% of the channels to be scrolled in either direction are included within a 1 inch scroll distance, another 30% are included within the 1 to 2 inch scroll distance (40% total within 2 inches), and the remaining 60% are included within the 2 to 3 inch scroll distance.

It should be noted that FIG. 4 is based on the contact point of the user's finger on the EPG being centrally placed and the point of inflection being associated with a channel near the middle of the channel spectrum.

If the contact point is at one end of the EPG, the bell curve may only have a single side that is calibrated based on the overall scrolling distance. If the contact point is off center by a significant amount the bell curve may be calibrated for based on the scrolling distance of the longer scroll side. For example, if the contact point of a six inch display is one inch from one side and 5 inches from the other side the bell curve may be generated such that the rows sizes associated with the channels are mapped out for five inches.

Figure 5:
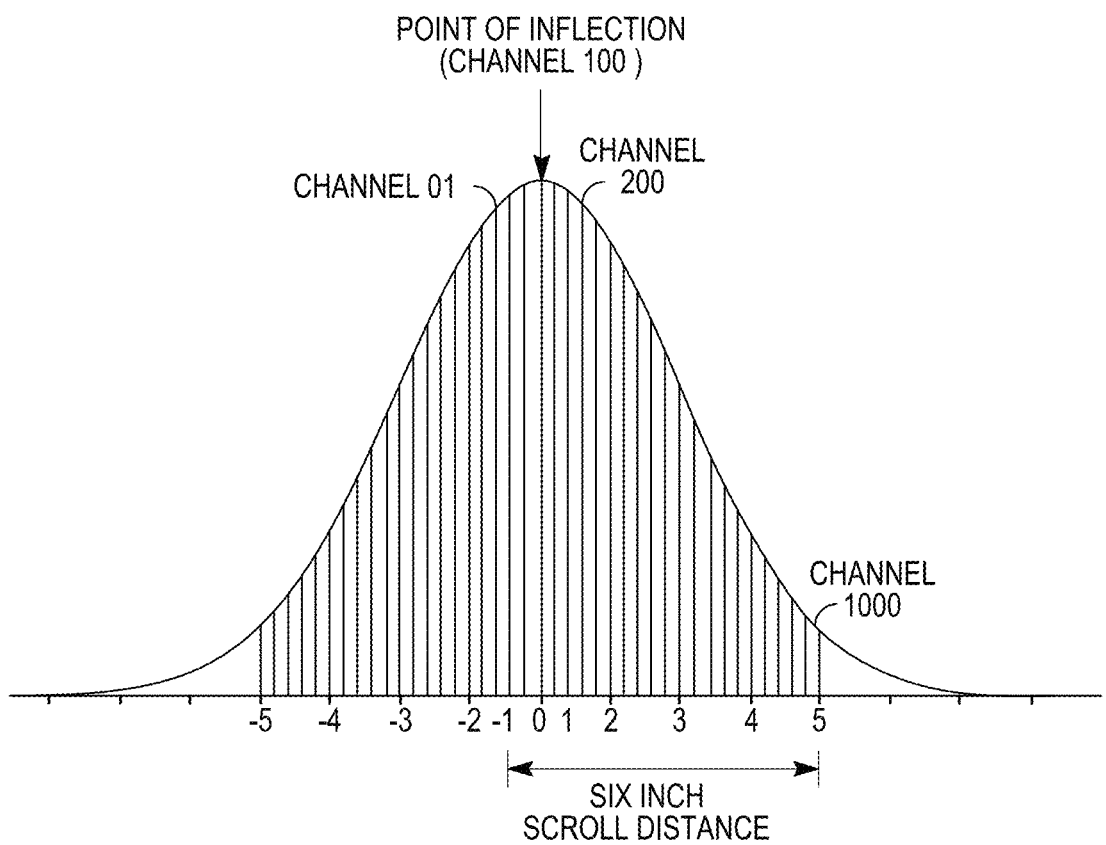
FIG. 5 illustrates an example graph of a non-linear scrolling implementation, in accordance with an embodiment.

FIG. 5 illustrates an example graph of a non-linear scrolling implementation, in accordance with an embodiment. The graph is a bell curve centered on a point of inflection (illustrated as channel 100). The bell curve may be generated based on a scroll distance, in the depicted example, of 5 inches in each direction. However, in the depicted example, the real scroll distance of 6 inches is 5 inches in one direction (upward) and 1 inch in the other direction (downward). The row heights associated with channels within one inch of scrolling distance on each side of the point of inflection are the same size. For example, channel 01 and channel 200 each a distance of one inch away from the point of inflection in opposite directions may have the same row size.

According to one embodiment, the EPG may allow wrapping of the channels during non-linear scrolling. For example, while scrolling upwards you may scroll past a last channel (e.g., channel 1000) and then continue scrolling from a first channel (e.g., channel 01). Channel wrapping may be useful is the channel associated with the point of inflection is not near the center of the channel spectrum.

Figure 6A:
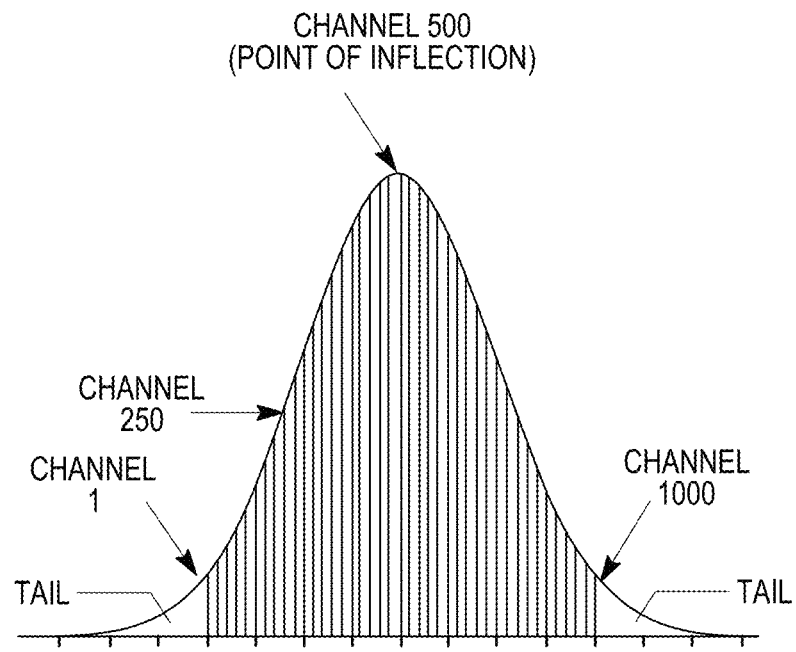
FIGS. 6A-B illustrate example graphs showing the recalibration of a point of inflection during use of a non-linear scrolling implementation, in accordance with an embodiment.
Figure 6B:
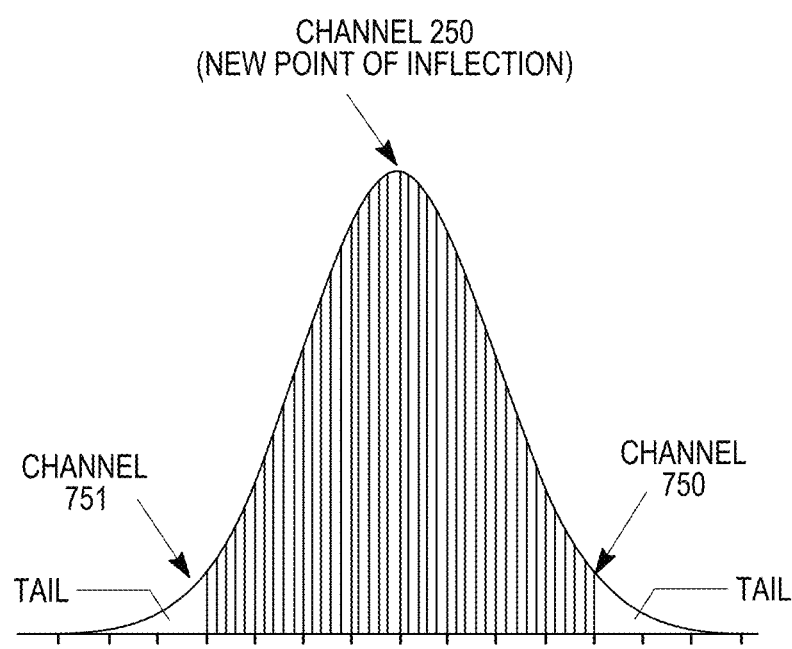

FIGS. 6A-B illustrate example graphs showing the recalibration of a point of inflection during use of a non-linear scrolling implementation, in accordance with an embodiment. FIG. 6A illustrates the example bell curve of FIG. 4 centered on channel 500 as the point of inflection. It is assumed that the user moved their contact point along the EPG (e.g., the program area) and traversed the bell curve in a downward direction until they paused at channel 250. The pause at channel 250 was long enough (e.g., greater than a predetermined amount of time that may be configurable) to have point of inflection recalibrated to channel 250.

FIG. 6B illustrates an example bell curve (e.g., same format as FIG. 5A) centered on channel 250 as the point of inflection. As channel 250 is not in the center of the channel spectrum (1-1000) the channels may be able to wrap around such that after scrolling downward to channel 01 the EPG can continue to scroll to channel 1000 and then down from there. As illustrated, a user can scroll downwards from the inflection point of channel 250 to channel 01 and then from channel 1000 down to channel 751. The user may scroll upward from the point of inflection to channel 750.

It should be noted that FIG. 6B appears to be based on the contact point of the users finger on the EPG being centrally placed. Considering that the user had just scrolled down from a central location associated with the channel 500 point of inflection it is likely that the contact point would be off centered and may require an adjustment to the bell curve.

The non-linear effects related to presentation of information and the non-linear scrolling thereof is not limited to bell curves. Rather any type of non-linear algorithms could be utilized without departing from the current scope.

Figure 7:
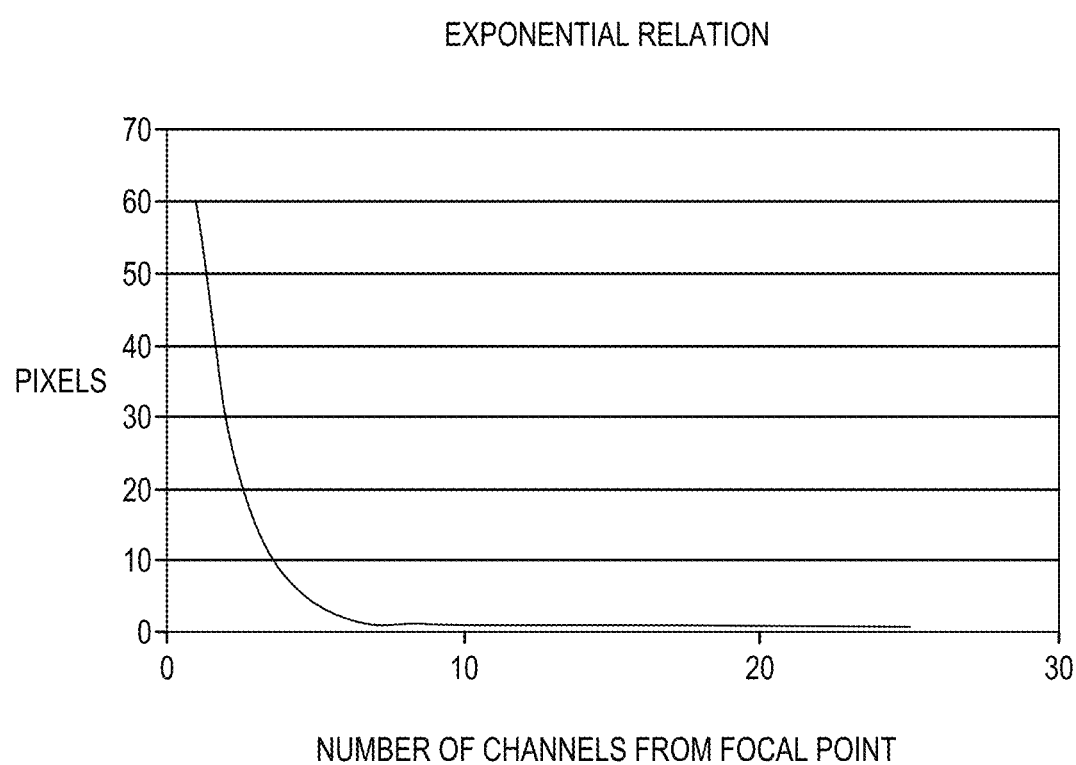
FIGS. 7-9 illustrate example graphs of non-linear scrolling implementations, in accordance with different embodiments.

FIG. 7 illustrates an example graph of a non-linear scrolling implementation, in accordance with an embodiment. The example graph provides an exponential relationship between the distance a channel (row) is from a point of inflection to the size of the row. The graph illustrates number of channel away from the point of inflection (focal point) along the x-axis and height (e.g., in pixels) of the rows along the y-axis. The illustrated exponential relationship is to half the size of a next row away from by focal point. As illustrated, the size of the rows may be cut in half from 60 pixels down to one pixel.

Figure 8:
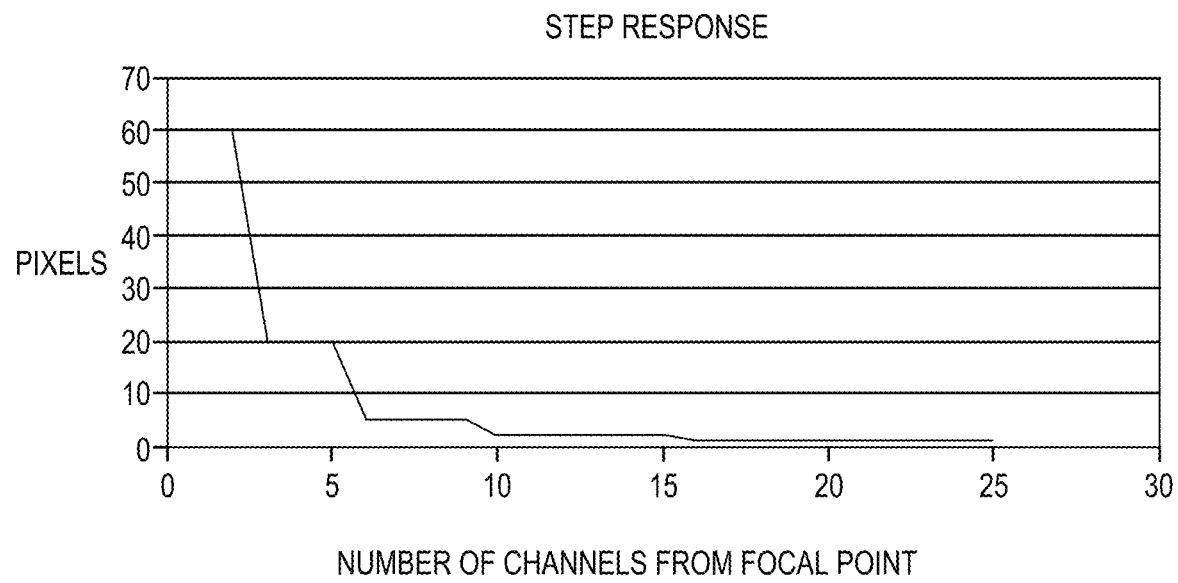

FIG. 8 illustrates an example graph of a non-linear scrolling implementation, in accordance with an embodiment. The example graph provides a step response for the distance a channel (row) is from a point of inflection to the size of the row. The step response includes several consecutive rows (a set of rows) having a defined height, followed by a next set of rows having a smaller height, and so on until the minimum height is obtained. As illustrated the first several rows have a row height of 60 pixels, followed by several rows at 20 pixels, and so on.

Figure 9:
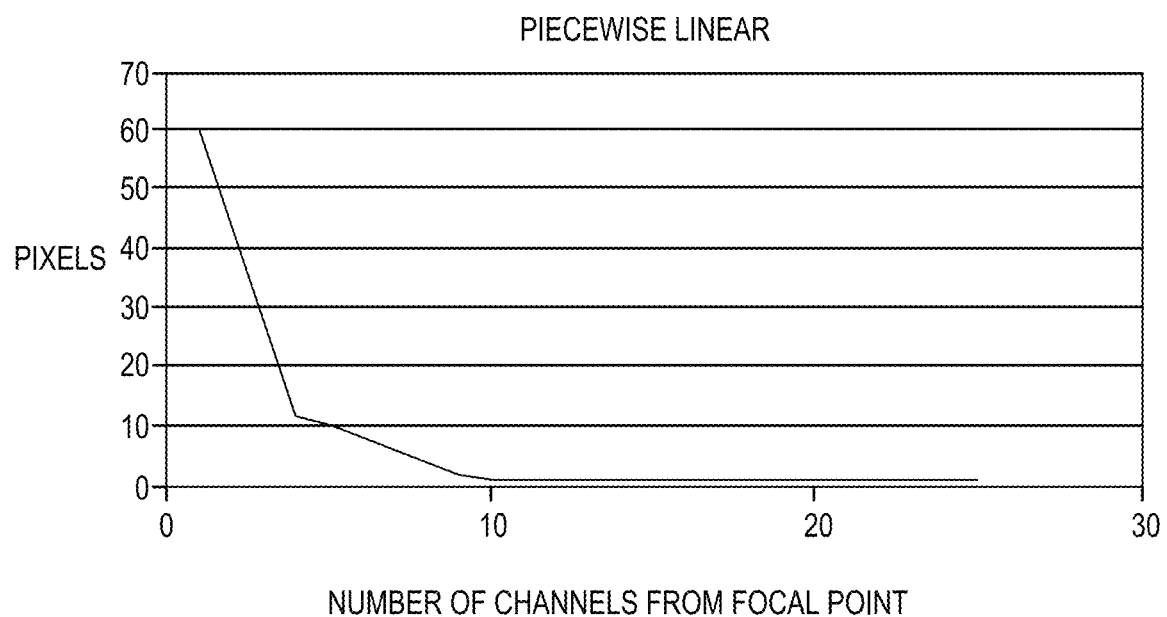

FIG. 9 illustrates an example graph of a non-linear scrolling implementation, in accordance with an embodiment. The example graph provides a piecewise linear relationship between the distance a channel (row) is from a point of inflection and the size of the row. The piecewise linear relationship may include a first linear relationship for a first set of rows, a second linear relationship for a second set of rows, and so on until the minimum height is obtained.

Regardless of the non-linear algorithm utilized, the non-linear presentation of information and the associated non-linear scrolling of the information provides a fine granularity for scrolling around a point of inflection selected by a user while also providing an accelerated scrolling to information farther away. The use of magnification of the content currently being scrolled over provides information for use in the accelerated scrolling and increases the accuracy thereof.

Figure 10:
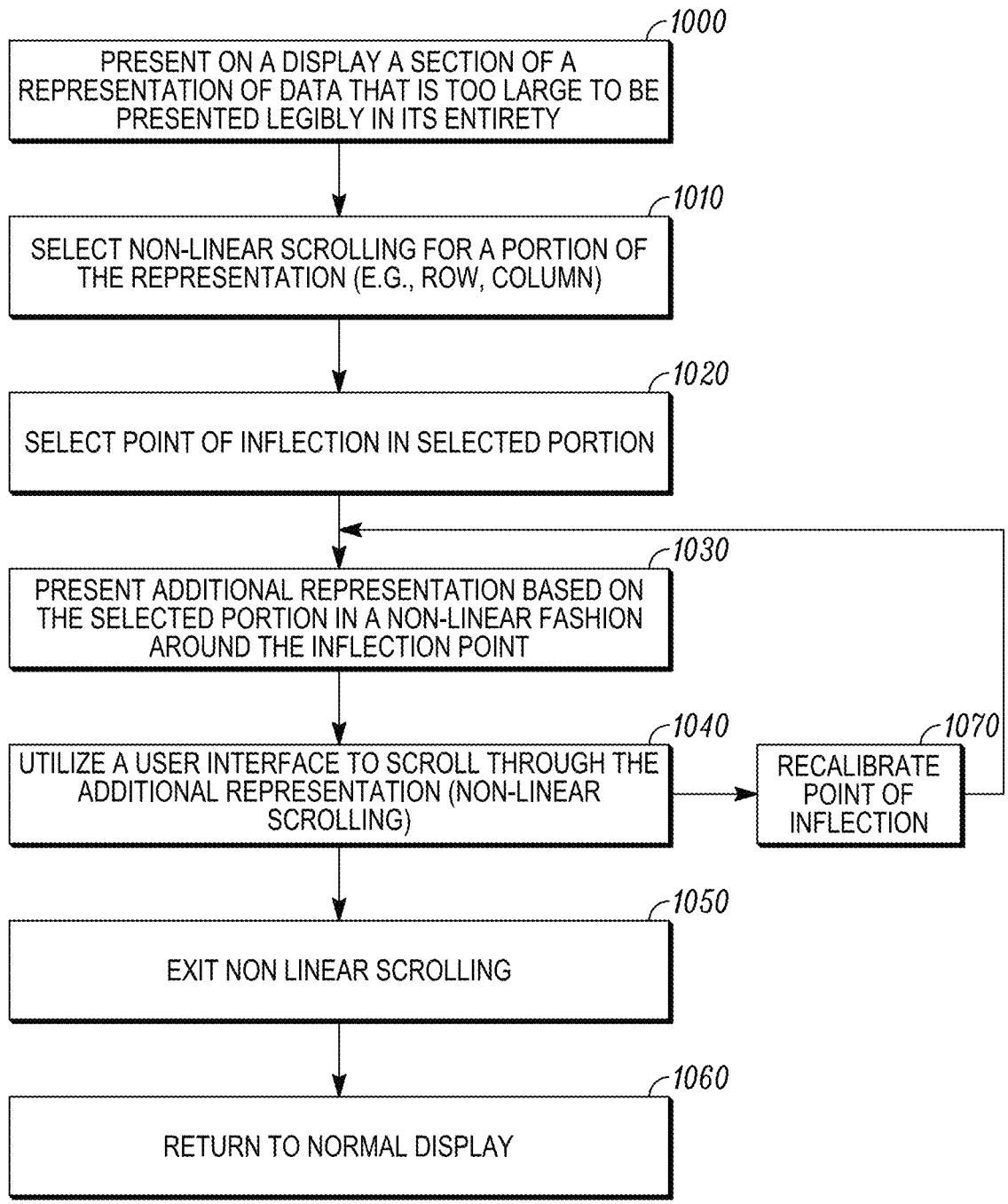
FIG. 10 illustrates an example flowchart for the implementation of nonlinear scrolling in a program presenting content that cannot fit legibility in its entirety on a display, in accordance with an embodiment.

FIG. 10 illustrates an example flowchart for the implementation of non linear scrolling in a program presenting a representation of data (e.g., EPG) that can not fit legibility in its entirety on a display. The process begins by the program presenting on a display a section of the representation 1000. Next, a user informs the program presenting the section of the representation (e.g., EPG) that non-linear scrolling has been selected 1010. The selection of non-linear scrolling may include selecting a defined portion (e.g., row, column) of the representation that you desire to scroll through. For example, in the EPG examples above the user was scrolling through channels so they selected the column in the EPG associated with channels for non-linear scrolling. A starting point (point of inflection) within the defined portion is selected 1020. The starting point is where the non-linear scrolling will start from. It should be noted the steps 1010, 1020 may be performed at the same time. For example, in the EPG examples above the non-linear scrolling was initiated and the inflection was selected when the user depressed a certain channel with the channel column for a defined amount of time.

Once non-linear scrolling and the point of inflection have been selected the section presented is modified to present additional representation (e.g., row, column) on the display 920. The additional representation may include all of the available representation (e.g., all of the channels available). The additional representation may be presented in a non-linear fashion around the inflection point. For example, in the EPG examples above the size of the rows for the channels above and below the channel identified as the point of inflection were reduced in size as they got further away from the point of inflection.

Once the additional representation is presented the user may utilize a user interface to scroll through the additional representation 1040. The scrolling is non-linear as the movement of the user interface will result in different amount of scrolling based on where the scrolling is with respect to the point of inflection. The non-linear scrolling provides fine granularity scrolling around the point of inflection while also providing accelerated scrolling to information farther away. It should be noted that during scrolling a enhancing (e.g., magnifying) effect may be utilized to provide information related to the location within the defined portion the scrolling is at (e.g., what channel the scrolling is at).

If the user is satisfied with the results of the non-linear scrolling (e.g., found content they were looking for, are in close proximity of the content) the user may exit non-linear scrolling 1050. For example, in the EPG examples above the non-linear scrolling was exited when the user removed their finger from the EPG. Once non-linear scrolling is exited the content returns to being displayed in a normal fashion based on the defined portion of the content the user had scrolled to 1060. For example, in the EPG examples above normal EPG display returns with the channel that was selected being presented therewithin.

During the course of linear scrolling the user may be scrolling in an accelerated fashion having course granularity and decide they want scroll with finer granularity as they get close to the desired selection. The user may recalibrate the point of inflection to provide a finer level of granularity in scrolling therearound 1070. For example, in the EPG examples above a user may recalibrated the point of inflection by pausing their scrolling on a certain point for a defined amount of time. After the point of inflection is recalibrated the presentation of the additional content may be updated to reflect the new inflection point (base non-linearity of presentation therearound) 1030.

The above examples for non-linear scrolling focused on scrolling through the channels on an EPG. It will be understood that the principles disclosed herein are not limited to scrolling through channels. Rather, any item illustrated on the EPG could be utilized for non-linear scrolling, including but not limited to scrolling through time periods. Furthermore, the above EPG examples focused on scrolling vertically within the EPG but are in no way intended to be limited thereby. Rather the EPG could scroll horizontally based on, for example, programs associated with a specific channel. Furthermore, the EPG could be scrolled through horizontally if the EPG was configured differently.

It will be understood that the principles disclosed herein are not limited to EPGs, and can readily be applied to and included in user interfaces for displaying and navigating any representation of data in which a user is typically presented with a larger area or volume of represented data (e.g., rows, columns, cells, tiles, fields) to navigate than the user can readily see on the display. The principles disclosed herein are applicable, for example, to user interfaces for displaying and navigating large spreadsheets, documents, images, maps, drawings, and the like.

Figure 11A:
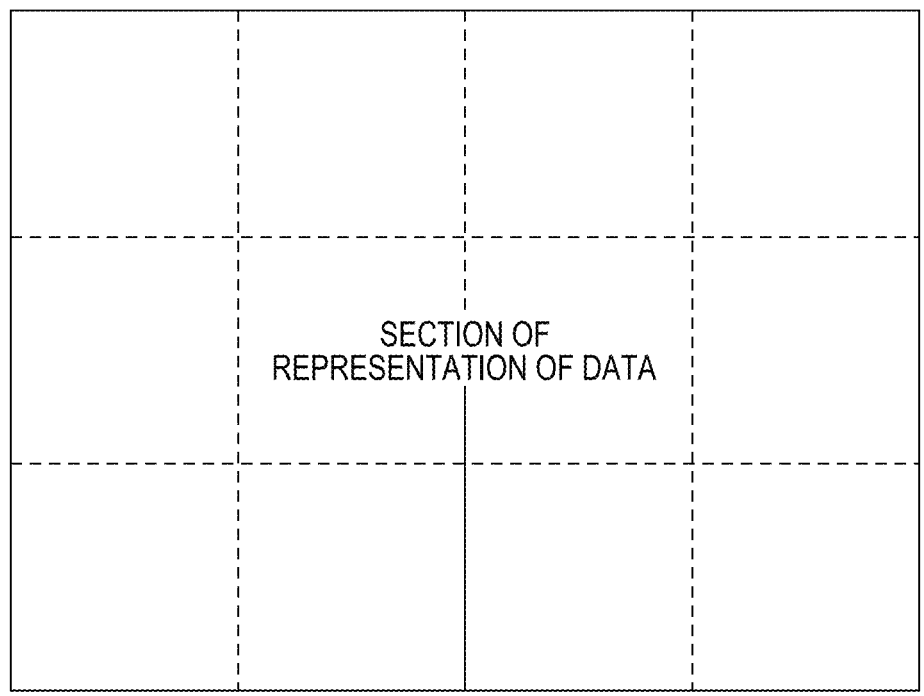
FIG. 11A illustrates a section of a representation of data presented on a display, according to an embodiment.

FIG. 11A illustrates a section of a representation of data presented on a display, according to an embodiment. The section does not include any identifiable portions (e.g., rows, columns) of the representation that one would typically desire to scroll through the representation based on. However, if non-linear scrolling is desirable the representation may be segregated into segments (a portion of the section) of a defined size. The segments may be arbitrarily assigned or may be assigned based on various parameters, including for example, overall size of the representation and what is included in the representation. The segments may be the same size or may vary. FIG. 11A illustrates the section divided into a grid of equal size segments (cells). It should be noted that the segregation of the section into segments may not be visible on the display or may be faintly visible so that that it does not interfere with the section being presented.

Figure 11B:
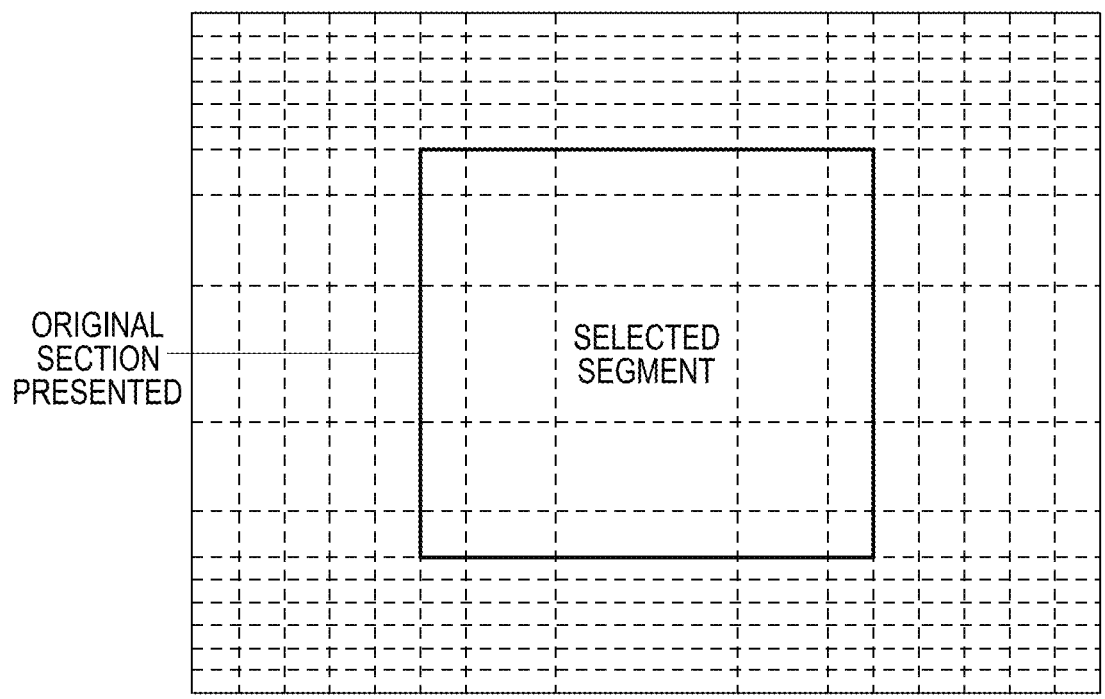
FIG. 11B illustrates the section presented on the display modified to include additional representation presented in a non-linear fashion, according to an embodiment.

FIG. 11B illustrates the section presented on the display modified to include additional representation presented in a non-linear fashion, according to an embodiment. As illustrated, a selected segment is presented centrally and segments extending in all directions therefrom are presented in a non-linear fashion (get smaller as they get farther away). The original section presented on the display is identified for point of reference. The representation within the segments may be deemphasized as the segments get farther away from the selected segment. When a user scrolls though the modified section presented the segment they are scrolling over may be enhanced (e.g., enlarged) to provide visibility into location on the representation during accelerated scrolling.

Figure 12A:
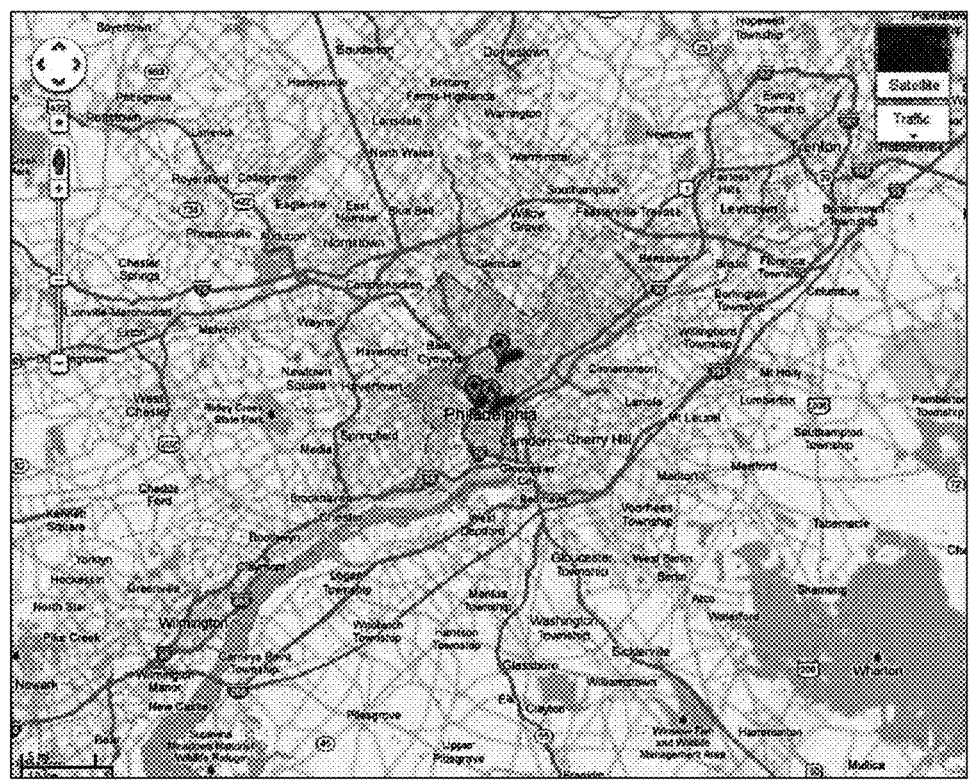
FIGS. 12A-B illustrate the use on non-linear scrolling on a map, according to an embodiment.
Figure 12B:
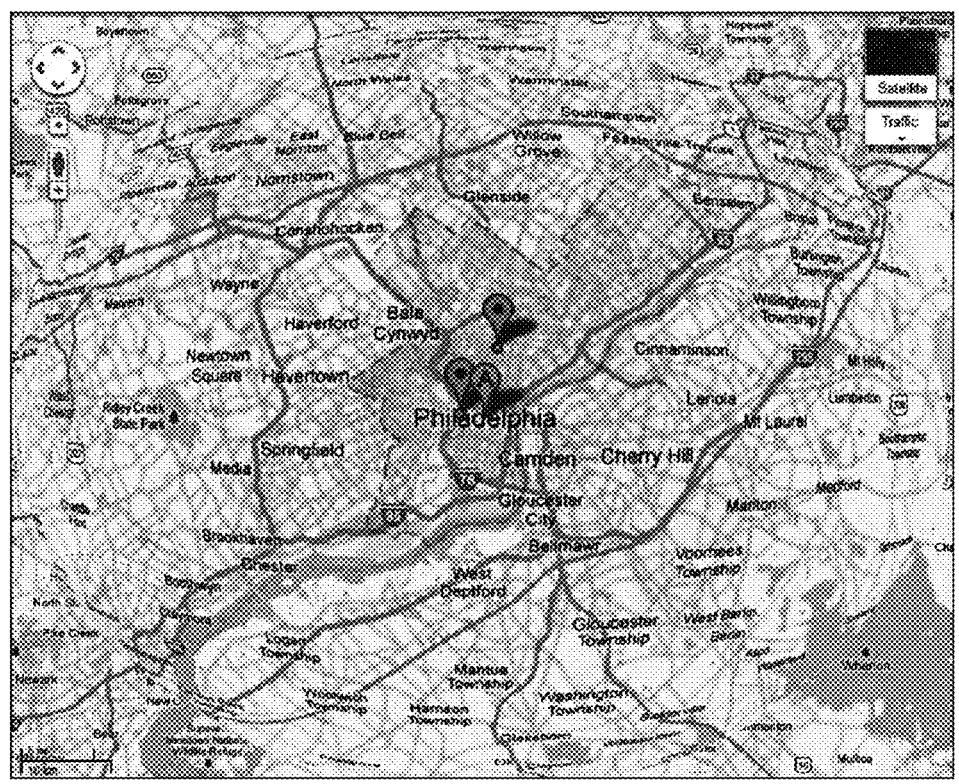

FIGS. 12A-B illustrate the use on non-linear scrolling on a map, according to an embodiment. FIG. 12A illustrates the map in a normal view while FIG. 12B illustrates the map as it may be presented for non-linear scrolling. The portion of the map that a user is currently scrolling over (e.g., Philadelphia) is enhanced (e.g., enlarged).

Figures 13A, 13B:
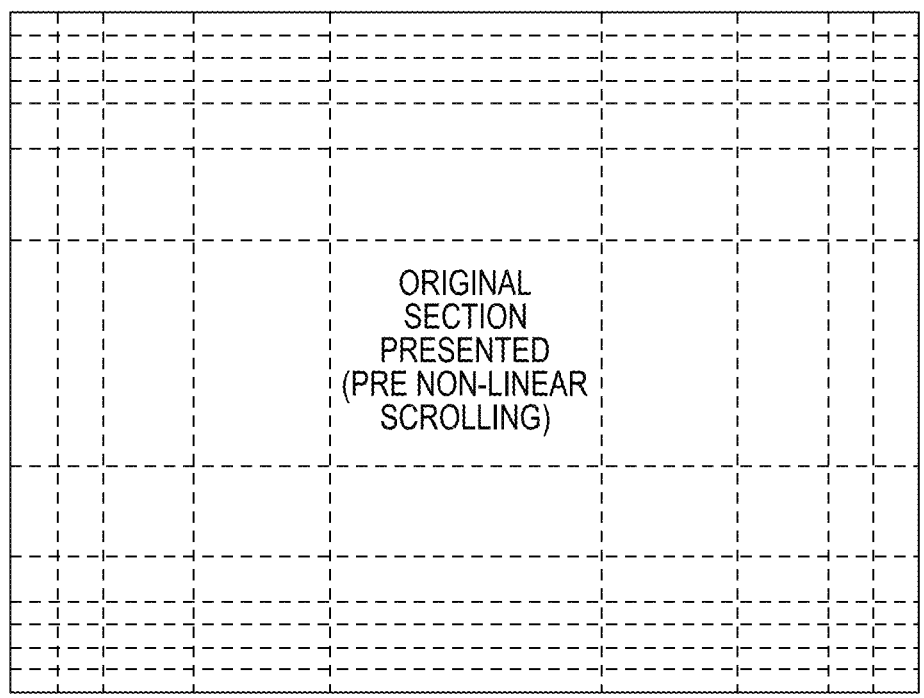
FIG. 13A illustrates a section of a representation of data presented on a display, according to an embodiment.
FIG. 13B illustrates the original section presented as one segment on the display with additional representations presented in a non-linear fashion, according to an embodiment.

FIG. 13A illustrates a section of a representation of data presented on a display, according to an embodiment. The section does not include any identifiable portions (e.g., rows, columns) of the representation that one would typically desire to scroll through the representation based on. In fact, if non-linear scrolling is desirable the entire section may become a point of inflection.

FIG. 13B illustrates the original section presented as one segment on the display with additional representations presented in a non-linear fashion, according to an embodiment. As illustrated, the original section is presented centrally and additional representations are included in additional segments extending in all directions therefrom. The additional segments are presented in a non-linear fashion (get smaller as they get farther away). The representation within the segments may be deemphasized as the segments get farther away from the selected segment (original section). When a user scrolls though the modified section presented, the segment they are scrolling over may be enhanced (e.g., enlarged) to provide visibility into location on the representation during accelerated scrolling.

It will be understood that the principles disclosed herein are applicable to, for example, the display of two dimensional (2D) data and three dimensional (3D) data.

FIGS. 14A-D illustrates several example views of a 3D representation of data according to an embodiment. The principles of non-linear scrolling may be provided for 3D images as well. The non-linear effects and the non-linear scrolling may occur in any of the three dimensions. In addition to the different emphasizing and deemphasizing modifications described with respect to the 2D presentations (e.g., increasing, decreasing, fading to black) the emphasizing and deemphasizing modifications in a 3D presentation may include additional modifications including, for example, changing the opacity.

Further illustrative applications will be apparent, for example, in any of numerous contexts where conventional user interfaces have included vertical and/or horizontal scroll bars for navigation of represented data. The foregoing examples and embodiments are illustrative and non-limiting.

It will be further understood that the applicability of the principles disclosed herein is not limited to touchscreen displays or touch-sensitive input devices. Although examples are provided of embodiments that use a touch-sensitive input device, other types of input devices (such as a pointing device or gestural interface) can be used.

CONCLUSION

The above referenced devices for carrying out the above methods can physically be provided on a circuit board or within another electronic device and can include various processors, microprocessors, controllers, chips, disk drives, and the like. It will be apparent to one of ordinary skill in the art that the modules, processors, controllers, units, and the like may be implemented as electronic components, software, hardware or a combination of hardware and software. Some embodiments provide the interactive user interface discussed above on a mobile device, smartphone, tablet computer, laptop or desktop computer, or other type of computing or processing device. While some devices and processors may be described or depicted herein as separate entities, the functions may be combined into fewer or greater number of physical entities.

Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

While the principles of the invention have been described above in connection with specific devices, apparatus, systems, and methods, it is to be clearly understood that this description is made only by way of example and not as limitation. One of ordinary skill in the art will appreciate that various modifications and changes can be made without departing from the scope of the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for vertical scrolling through a representation of data comprising a plurality of rows, wherein said representation of data is too large to be presented legibly in its entirety within confines of a display, the method comprising:
   presenting, on the display, a section of the representation;
   selecting, using the section presented on the display, a portion of the representation for scrolling on;
   modifying presentation of the section presented on the display to include additional content of the representation based on the portion selected, wherein the additional content of the representation is to be presented in a non-linear fashion;

receiving input from a user interface device to scroll through the additional content of the representation, wherein the input comprises making contact with a first point presented on the display, wherein the first point is established as a first contact point when the contact with the first point is maintained for at least a defined amount of time, the input further comprising movement from the first point presented on the display to provide non-linear scrolling through the additional content of the representation; and based on receiving a second input associated with selection of a second point presented on the display and a pause in movement at the second point for a predetermined amount of time, wherein the second input comprises a movement of the contact with the first point away from the first point presented on the display to provide non-linear scrolling through the additional content of the representation, and magnifying the row the user input is associated with at any point during the scrolling, recalibrating a point of inflection from a first point of inflection associated with the first point to a second point of inflection associated with the second point, wherein the second point of inflection comprises a height as defined by a curve, wherein the curve comprises a plurality of other points, each respective one of the plurality of other points comprising a respective height as defined by the curve; and modifying presentation of the section presented on the display to present content associated with the second point at the height defined by the curve for the second point of inflection and to present content associated with each respective one of the plurality of other points at the respective height defined by the curve for the respective other point, wherein the second point is associated with a channel, and wherein the content associated with the second point comprises information associated with the channel;

wherein the representation is an electronic program guide, wherein information in the electronic program guide is placed in the background of the presentation in response to the non-linear scrolling.

2. The method of claim 1, wherein the selecting the portion of representation for scrolling on includes identifying the point of inflection within the portion.

3. The method of claim 2, wherein the additional content of the representation is to be presented in a non-linear fashion based on distance from the point of inflection.

4. The method of claim 3, wherein the non-linear fashion includes a bell curve.

5. The method of claim 3, wherein the non-linear fashion includes a piecewise linear function.

6. The method of claim 2, wherein the additional content of the representation is to be presented such that it is deemphasized as it gets further from the point of inflection.

7. The method of claim 6, wherein deemphasizing includes getting smaller.

8. The method of claim 6, wherein deemphasizing includes fading to black.

9. The method of claim 6, wherein deemphasizing includes changing opacity.

10. The method of claim 1, wherein at least a part of the additional content of the representation may be illegible.

11. The method of claim 1, further comprising emphasizing a part of the additional content of the representation associated with a current location of the scrolling.

12. The method of claim 11, wherein the emphasizing includes enlarging.

13. The method of claim 2, wherein the input comprising movement around the point of inflection provides scrolling with fine granularity.

14. The method of claim 2, wherein the input comprising movement away from the point of inflection provides accelerated scrolling.

15. The method of claim 14, further comprising emphasizing a part of the additional content of the representation associated with a current location of the scrolling, wherein the emphasizing provides guidance regarding location of the accelerated scrolling.

16. The method of claim 2, further comprising recalibrating the point of inflection.

17. The method of claim 16, wherein the recalibrating the point of inflection includes pausing the input associated with movement for a predetermined amount of time.

18. The method of claim 1, wherein the portion of the representation is a row.

19. The method of claim 1, wherein the portion of representation is a column.

20. The method of claim 1, wherein the portion of representation is a row and column.

21. The method of claim 1, wherein the portion of representation is the section of the representation.

22. The method of claim 1, wherein the representation is a two dimensional data representation.

23. The method of claim 1, wherein the representation is a three dimensional data representation.

24. The method of claim 1, wherein the representation is a listing of various items of information for purposes of permitting the user to utilize the user interface device to interactively view or select the various items.

25. The method of claim 1, wherein the portion of representation includes at least some subset of channel and time.

26. The method of claim 1, wherein the input comprising movement of the user interface device is mapped directly to movement of the scrolling through the additional content of the representation.

27. The method of claim 1, wherein the modifying presentation of the section presented on the display includes modifying part of the section not within the portion selected.

28. A non-transitory computer readable medium comprising stored instructions, wherein when executed by a processor cause the processor to:

present on a display a section of a representation of data comprising a plurality of rows, wherein the representation is too large to be presented legibly in its entirety within confines of the display;

select, using the section presented on the display, a portion of the representation for scrolling on;

modify presentation of the section presented on the display to include additional content of the representation based on the portion selected, wherein the additional content of the representation is to be presented in a non-linear fashion;

process inputs from a user interface device associated with movement thereof, wherein the inputs comprise making contact with a first point presented on the display, wherein the first point is established as a first contact point when the contact with the first point is maintained for at least a defined amount of time, the input further comprising movement away from the first point of the user interface to provide non-linear scrolling through the additional content of the representation; and based on receiving a second input associated with selection of a second point of the user interface and a pause in movement at the second point fora predetermined amount of time, recalibrating the point of inflection from a first point of inflection associated with the first point to a second point of inflection associated with the second point, wherein the second point of inflection comprises a height as defined by a curve, wherein the curve comprises a plurality of other points, each respective one of the plurality of other points comprising a respective height as defined by the curve, wherein the second input comprises a movement of the contact with the first point away from the first point presented on the display to provide non-linear scrolling through the additional content of the representation, and magnifying the row the user input is associated with at any point during the scrolling; and modify presentation of the section presented on the display to present content associated with the second point at the height defined by the curve for the second point of inflection and to present content associated with each respective one of the plurality of other points at the respective height defined by the curve for the respective other point, wherein the second point is associated with a channel, and wherein the content associated with the second point comprises information associated with the channel; and wherein the representation is an electronic program guide, wherein information in the electronic program guide is placed in the background of the presentation in response to the non-linear scrolling.

29. The non-transitory computer readable medium of claim 28, wherein the stored instructions, when executed by the processor further cause the processor to identify a point of inflection within the portion, wherein the additional content of the representation is to be presented such that it decreases in size as it gets further from the point of inflection.

30. The non-transitory processor readable medium of claim 29, wherein the stored instructions, when executed by the processor further cause the processor to recalibrate the point of inflection.

31. The non-transitory processor readable medium of claim 28, wherein the stored instructions, when executed by the processor further cause the processor to enlarge a part of the additional content associated with a current location of the scrolling.

32. An interactive device comprising
a memory in communication with at least one processor;
a display device in communication with the at least one processor, and configured by one or more programs to:
present a section of a representation of data, wherein the representation is too large to be presented legibly in its entirety within confines of the display;
modify presentation of the section presented on the display to include additional content of the representation based on a portion of the section selected for scrolling, wherein the additional content of the representation is to be presented in a non-linear fashion; and
scroll through the modified presentation of the section based on user instructions received; and
a user interface in communication with the at least one processor, and operable to:
receive a selection from a user, from the section presented on the display, of the portion of the representation for scrolling; and
receive the user instructions from the user, for scrolling through the modified presentation, wherein the user instructions comprise making contact with a first point presented on the display, wherein the first point is established as a first contact point when the contact with the first point is maintained for at least a defined amount of time, the input further causing non-linear scrolling through the additional content of the representation from a first point;
receive a second selection from the user, the second selection associated with selection of a second point presented on the display and a pause in movement at the second point for a predetermined amount of time, wherein the second selection comprises a movement of the contact with the first point away from the first point presented on the display to provide non-linear scrolling through the additional content of the representation, and magnifying the row the user selection is associated with at any point during the scrolling; and
recalibrate a point of inflection from a first point of inflection associated with the first point to a second point of inflection associated with the second point, wherein the second point of inflection comprises a height as defined by a curve, wherein the curve comprises a plurality of other points, each respective one of the plurality of other points comprising a respective height as defined by the curve; and
modify presentation of the section presented on the display to present content associated with the second point at the height defined by the curve for the second point of inflection and to present content associated with each respective one of the plurality of other points at the respective height defined by the curve for the respective other point, wherein the second point is associated with a channel, and wherein the content associated with the second point comprises information associated with the channel; and
wherein the representation is an electronic program guide, wherein information in the electronic program guide is placed in the background of the presentation in response to the non-linear scrolling.

* * * * *